(12) United States Patent
Delaney et al.

(10) Patent No.: US 12,422,524 B2
(45) Date of Patent: Sep. 23, 2025

(54) LIDAR SENSOR SYSTEM INCLUDING PARTICULAR OPTIC DESIGN

(71) Applicant: Aurora Operations, Inc., Pittsburgh, PA (US)

(72) Inventors: Colin Delaney, Bozeman, MT (US); Allen Earman, Santa Clara, CA (US); James Ferrara, Oakland, CA (US); Parth Panchal, San Jose, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 18/933,680

(22) Filed: Oct. 31, 2024

(65) Prior Publication Data

US 2025/0164609 A1    May 22, 2025

Related U.S. Application Data

(63) Continuation of application No. PCT/US2024/053568, filed on Oct. 30, 2024.

(60) Provisional application No. 63/602,252, filed on Nov. 22, 2023, provisional application No. 63/602,265, filed on Nov. 22, 2023.

(51) Int. Cl.
*G01S 7/481*  (2006.01)
*G01S 17/931*  (2020.01)

(52) U.S. Cl.
CPC ............ *G01S 7/4813* (2013.01); *G01S 7/481* (2013.01); *G01S 7/4817* (2013.01); *G01S 17/931* (2020.01)

(58) Field of Classification Search
CPC .................................................. G01S 17/931
See application file for complete search history.

(56) References Cited

U.S. PATENT DOCUMENTS

| 9,823,496 B1 | 11/2017 | Doerr |
| 2010/0008675 A1* | 1/2010 | De Dobbelaere .... G02B 6/4295 398/135 |
| 2016/0274305 A1 | 9/2016 | Ye et al. |
| 2018/0188371 A1 | 7/2018 | Bao et al. |
| 2021/0159664 A1 | 5/2021 | Liu et al. |
| 2021/0223369 A1 | 7/2021 | Lee et al. |
| 2022/0003845 A1* | 1/2022 | Wang ................. H01S 5/02326 |

(Continued)

OTHER PUBLICATIONS

International Search Report and Written Opinion for Application PCT/US2024/053568, mailed Feb. 13, 2025, 12 pages.

*Primary Examiner* — Isam A Alsomiri
*Assistant Examiner* — Joseph C Fritchman
(74) *Attorney, Agent, or Firm* — Dority & Manning, P.A.

(57) ABSTRACT

A Light Detection and Ranging (LIDAR) sensor system for a vehicle includes: a housing defining a cavity, a first mount positioned within the cavity, a second mount positioned within the cavity, and a micro optics assembly. The micro optics assembly includes a first portion provided on the first mount and a second portion provided on the second mount. The first portion includes: a light source to emit a beam, a first optical component to direct the beam, an optical isolator to allow the beam directed by the first optical component to pass through the optical isolator and to prevent light from being reflected back into the light source, and a second optical component to direct the beam after having passed through the optical isolator. The second portion includes an optical chip assembly to receive the beam after having been directed by the second optical component.

20 Claims, 17 Drawing Sheets

(56) References Cited

U.S. PATENT DOCUMENTS

| | | | |
|---|---|---|---|
| 2022/0043127 A1 | 2/2022 | LaChapelle et al. | |
| 2022/0050203 A1 | 2/2022 | Keilaf et al. | |
| 2022/0107411 A1 | 4/2022 | Koonath et al. | |
| 2022/0291345 A1 | 9/2022 | Wang et al. | |
| 2022/0320832 A1* | 10/2022 | Koch | G02B 6/2808 |
| 2023/0318247 A1* | 10/2023 | Rabadam | H01S 3/0405 |
| | | | 372/34 |
| 2023/0377907 A1* | 11/2023 | Wu | H01L 25/50 |
| 2024/0134044 A1 | 4/2024 | Li et al. | |

\* cited by examiner

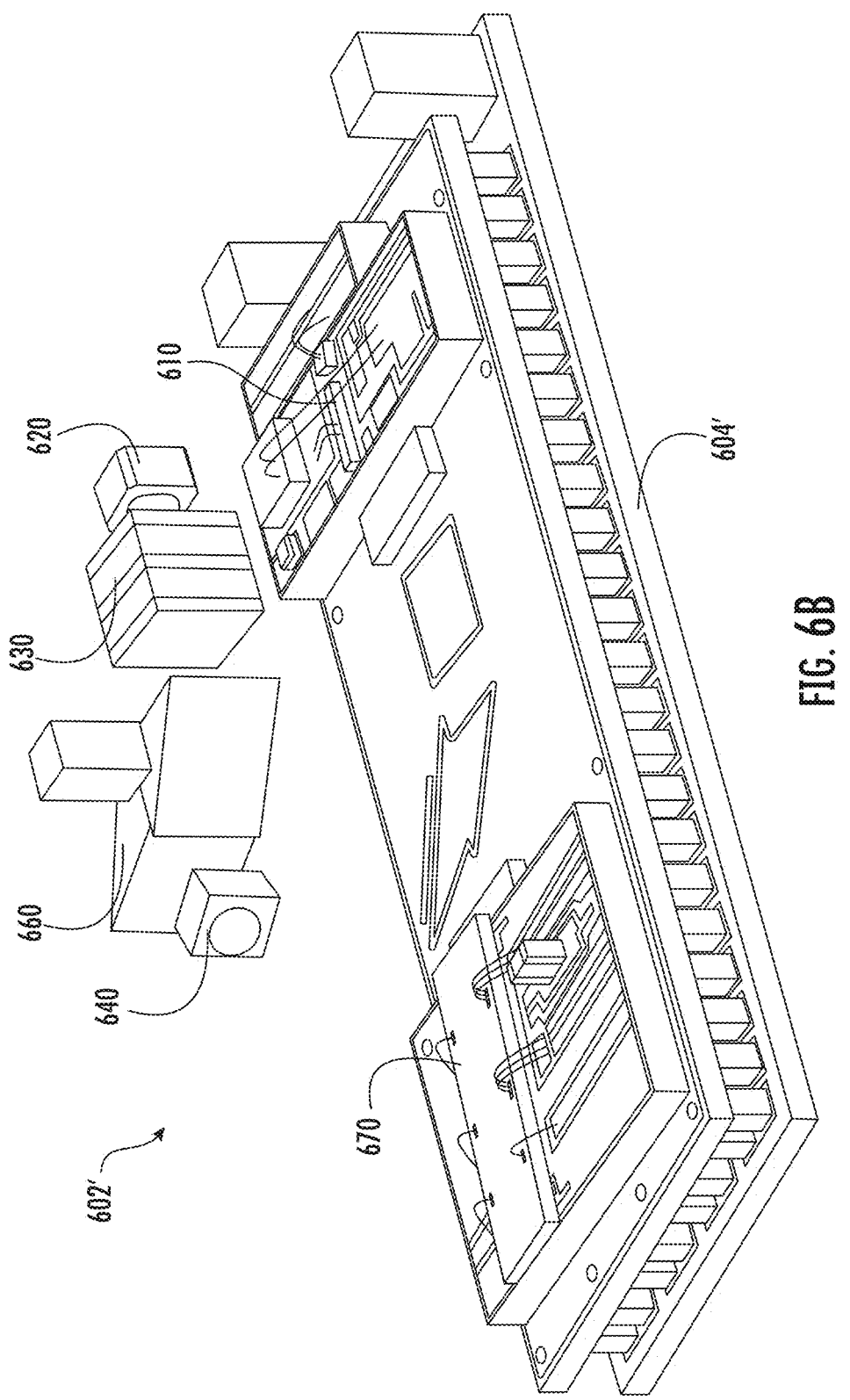

LIDAR SENSOR SYSTEM INCLUDING PARTICULAR OPTIC DESIGN

CROSS-REFERENCE TO RELATED APPLICATIONS

This application is a continuation of International Application No. PCT/US24/53568 filed on Oct. 30, 2024, which claims the right of priority to U.S. Provisional Application No. 63/602,252, filed on Nov. 22, 2023, and to U.S. Provisional Application No. 63/602,265, filed on Nov. 22, 2023. Applicant claims priority to and the benefit of each of such applications and incorporates all such applications herein by reference in their entirety for all purposes.

BACKGROUND

Light Detection and Ranging (LIDAR) systems use lasers to create three-dimensional representations of surrounding environments. A LIDAR system includes at least one emitter paired with a receiver to form a channel, though an array of channels may be used to expand the field of view of the LIDAR system. During operation, each channel emits a laser beam into the environment. The laser beam reflects off of an object within the surrounding environment, and the reflected laser beam is detected by the receiver. A single channel provides a single point of ranging information. Collectively, channels are combined to create a point cloud that corresponds to a three-dimensional representation of the surrounding environment.

SUMMARY

Aspects and advantages of implementations of the disclosure will be set forth in part in the following description, or may be learned from the description, or may be learned through practice of the implementations.

Example aspects of the disclosure are directed to LIDAR systems. As further described herein, the LIDAR systems can be used by various devices and platforms (e.g., robotic platforms, etc.) to improve the ability of the devices and platforms to perceive their environment and perform functions in response thereto (e.g., autonomously navigating through the environment).

The disclosure is directed to LIDAR systems for use with, for example, vehicles. In some implementations, the LIDAR system can include a LIDAR module that includes a light source (e.g., an emitter) configured to emit a light beam (e.g., a laser beam). The LIDAR module can include an optic device configured to split the light beam into a plurality of light beams. The LIDAR module can further include an optical amplifier array configured to amplify the plurality of light beams to generate a plurality of amplified light beams. For instance, the optical power of the amplified light beams can, in some implementations, range from 10 decibels greater than an optical power of the plurality of light beams to 30 decibels greater than the optical power of the plurality of light beams. The LIDAR module can further include a transceiver configured to facilitate transmitting the plurality of amplified light beams into a surrounding environment. The transceiver is further configured to receive return light beams from the surrounding environment that can be combined to generate point cloud data representative of objects in the surrounding environment.

An integrated LIDAR system may include complex circuits of photonic elements, which may include multiple types of semiconductor materials. An optical signal (e.g., a light signal) generally propagates in a single direction through the LIDAR system through one or more waveguides, such as from a laser source to optics and/or from optics to a signal converter.

According to examples of the disclosure, the number of elements that make up these circuits, the interfaces between semiconductor materials, and other components of the LIDAR system may be varied or reduced to achieve a compact size for the LIDAR system.

The disclosure provides examples of particular optic designs which can be implemented in a LIDAR system. In an example embodiment, a micro optics assembly includes a light source configured to emit a beam, at least one first optical component (e.g., a collimating lens) configured to direct the beam emitted by the light source, at least one optical isolator configured to allow the beam directed by the at least one first optical component to pass through the at least one optical isolator in a first direction and to prevent light from being reflected back into the light source through the at least one optical isolator in a second direction, at least one second optical component (e.g., a collimating lens) configured to direct the beam after having passed through the at least one optical isolator, and an optical chip assembly configured to receive the beam after having been directed by the at least one second optical component.

In some implementations, the optical chip assembly includes a first chip (e.g., a semiconductor optical amplifier (SOA) chip), a second chip (e.g., a U-turn chip), and a third chip (e.g., an optical circuit chip such as a PIC chip or a PLC chip). The optical chip assembly can be configured to amplify the beam to produce an amplified beam, split the amplified beam into a plurality of distributed beams, and emit the plurality of distributed beams toward an object in the environment of the vehicle. The SOA chip, U-turn chip, and optical circuit chip may be stacked sequentially with respect to each other, with the U-turn chip being furthest upstream and the optical circuit chip being the furthest downstream.

In some implementations, the LIDAR system can include a receiver configured to receive a reflected beam from the object.

The micro optics assembly can include additional components based on a desired functionality or space constraints. In some implementations, the micro optics assembly can include one or more optical components (e.g., prisms) configured to reflect the beam that has passed through the at least one optical isolator toward the at least one second optical component at a particular angle. For example, the optical component may be adjustable to change the particular angle at which the beam is reflected toward the at least one second optical component (e.g., the particular angle may be adjustable between 0 degrees to 30 degrees, between 15 degrees to 25 degrees, etc.). In some implementations, a plurality of prisms may be provided. The prisms may be separated from one another or may be adhered (e.g., cemented) to each other.

In some implementations, the micro optics assembly can include a further optical circuit chip (e.g., a PIC chip or a PLC chip) provided between the at least one second optical component and the optical chip assembly. The further optical circuit chip can be configured to encode the signal and split the signal into two data streams (two beams).

In some implementations, the micro optics assembly can include one or more third optical components (e.g., a plurality of lens arrays) provided between the further optical circuit chip and the optical chip assembly. The one or more third optical components (e.g., a plurality of lens arrays)

may be formed of a different material than the first and second optical components. For example, the one or more third optical components may be formed of silicon while the first and second optical components may be formed of glass. The one or more third optical components can be configured to direct the beam(s) after having passed through the further optical circuit chip to focus the beam(s) onto the optical chip assembly (e.g., the U-turn chip). In some implementations, the micro optics assembly can include at least one further optical isolator provided between the further optical circuit chip and the optical chip assembly.

The micro optics assembly may be provided or contained within a housing (e.g., formed at least partially of gold). In some implementations, a plurality of first components can be provided at a first portion within the housing. The plurality of first components can include the light source, at least one first optical component, at least one optical isolator, at least one second optical component, further optical circuit chip, and at least one further optical isolator. The first portion of the housing can include a common ceramic or a thermoelectric cooler (TEC). In some examples, the first portion of the housing may have dimensions of about 20 mm by about 10 mm. The housing may also include: (i) a machined CuW base with cutouts, through-holes, and laser-etched fiducials, (ii) a 3-sided CuW wall with cutouts for electrical feedthroughs, and (iii) AlN electrical feedthroughs for DC and RF electrical signals.

In some implementations, a plurality of second components can instead be provided at the first portion within the housing. The plurality of second components can include the light source, at least one first optical component, at least one optical isolator, and at least one second optical component.

In some implementations, a plurality of third components can instead be provided at the first portion within the housing. The plurality of third components can include the light source, at least one first optical component, at least one optical isolator, and at least one second optical component, and the further optical circuit chip. In some implementations, the beam may be directed to the optical chip assembly at a same angle as the angle at which the beam is directed to the further optical circuit chip (e.g., about 20 degrees). In some implementations, the beam may be directed to the optical chip assembly at a different angle (e.g., about 0 degrees) as the angle at which the beam is directed to the further optical circuit chip (e.g., about 20 degrees).

Example aspects of the disclosure can provide a number of technical effects and benefits. As one example, example aspects of the disclosure can improve the robustness of LIDAR systems and/or components of LIDAR systems by reducing the number of components included in the housing which simplifies the design of the micro optics assembly/LIDAR system and reduces costs which achieving a similar functionality as previous micro optics assembly/LIDAR systems having more components. Furthermore, the disclosed micro optics assembly may have a smaller, more compact, size, thus saving space and reducing weight.

For example, in an aspect, the disclosure provides a Light Detection and Ranging (LIDAR) sensor system for a vehicle. For example, the LIDAR sensor system includes: a light source configured to emit a beam; at least one first optical component configured to direct the beam emitted by the light source; at least one optical isolator configured to allow the beam directed by the at least one first optical component to pass through the at least one optical isolator in a first direction and to prevent light from being reflected back into the light source through the at least one optical isolator in a second direction; at least one second optical component configured to direct the beam after having passed through the at least one optical isolator; an optical chip assembly comprising a plurality of chips configured to receive the beam after having been directed by the at least one second optical component and to emit the beam toward an object in an environment of the vehicle; and a receiver configured to receive a reflected beam from the object.

In some implementations, the at least one first optical component includes a collimating lens.

In some implementations, the at least one second optical component includes a collimating lens.

In some implementations, the at least one second optical component is offset from the at least one first optical component in a direction perpendicular to a direction along which the beam is emitted from the light source.

In some implementations, the LIDAR sensor system further includes at least one third optical component configured to reflect the beam that has passed through the at least one optical isolator toward the at least one second optical component at a particular angle.

In some implementations, the at least one third optical component includes at least one prism.

In some implementations, the at least one third optical component is adjustable to change the particular angle at which the beam is reflected toward the at least one second optical component.

In some implementations, the LIDAR sensor system further includes an optical circuit chip provided between the at least one second optical component and the optical chip assembly.

In some implementations, the LIDAR sensor system further includes at least one third optical component provided between the optical circuit chip and the optical chip assembly.

In some implementations, the at least one third optical component includes a plurality of lens arrays.

In some implementations, the LIDAR sensor system further includes at least one further optical isolator provided between the optical circuit chip and the optical chip assembly.

In some implementations, the optical chip assembly is configured to amplify the beam to produce an amplified beam, split the amplified beam into a plurality of distributed beams, and emit the plurality of distributed beams toward the object.

For example, in an aspect, the disclosure provides an autonomous vehicle (AV) control system for a vehicle. For example, the AV control system includes: one or more processors; a light source configured to emit a beam; at least one first optical component configured to direct the beam emitted by the light source; at least one optical isolator configured to allow the beam directed by the at least one first optical component to pass through the at least one optical isolator in a first direction and to prevent light from being reflected back into the light source through the at least one optical isolator in a second direction; at least one second optical component configured to direct the beam after having passed through the at least one optical isolator; and an optical chip assembly comprising a plurality of chips configured to receive the beam after having been directed by the at least one second optical component In some implementations, the optical chip assembly is configured to amplify the beam to produce an amplified beam, split the amplified beam into a plurality of distributed beams, and emit the plurality of distributed beams toward an object in an environment of the vehicle.

In some implementations, the at least one first optical component includes a collimating lens, and the at least one second optical component includes a collimating lens.

In some implementations, the AV control system further includes at least one third optical component configured to reflect the beam that has passed through the at least one optical isolator toward the at least one second optical component at a particular angle.

In some implementations, the AV control system further includes an optical circuit chip provided between the at least one second optical component and the optical chip assembly.

For example, in an aspect, the disclosure provides an autonomous vehicle. For example, the autonomous vehicle includes: an autonomous vehicle control system, the autonomous vehicle control system including one or more processors and a LIDAR sensor system, the LIDAR sensor system including: a micro optics assembly, comprising: a light source configured to emit a beam, at least one first optical component configured to direct the beam emitted by the light source, at least one optical isolator configured to allow the beam directed by the at least one first optical component to pass through the at least one optical isolator in a first direction and to prevent light from being reflected back into the light source through the at least one optical isolator in a second direction, at least one second optical component configured to direct the beam after having passed through the at least one optical isolator, and an optical chip assembly comprising a plurality of chips configured to receive the beam after having been directed by the at least one second optical component and to emit the beam toward an object in an environment of the autonomous vehicle, and a receiver configured to receive a reflected beam from the object and determine an object detection associated with the object; and an autonomous vehicle controller configured to control the autonomous vehicle based on the object detection associated with the object.

In some implementations, the optical chip assembly is configured to amplify the beam to produce an amplified beam, split the amplified beam into a plurality of distributed beams, and emit the plurality of distributed beams toward the object.

In some implementations, the micro optics assembly includes an optical circuit chip provided between the at least one second optical component and the optical chip assembly.

For example, in an aspect, the disclosure provides a Light Detection and Ranging (LIDAR) sensor system for a vehicle. For example, the LIDAR sensor system includes: a housing defining a cavity having a length defined along a first axis and a width defined along a second axis that is different from the first axis; a first mount positioned at a first portion of the housing within the cavity; a second mount positioned at a second portion of the housing within the cavity; and a micro optics assembly including a first portion which is provided on the first mount and a second portion which is provided on the second mount, wherein: the first portion of the micro optics assembly comprises: a light source configured to emit a beam, at least one first optical component configured to direct the beam emitted by the light source, at least one optical isolator configured to allow the beam directed by the at least one first optical component to pass through the at least one optical isolator in a first direction and to prevent light from being reflected back into the light source through the at least one optical isolator in a second direction, and at least one second optical component configured to direct the beam after having passed through the at least one optical isolator, and the second portion of the micro optics assembly comprises: an optical chip assembly comprising a plurality of chips configured to receive the beam after having been directed by the at least one second optical component.

In some implementations, a length of the first mount is greater than a width of the first mount.

In some implementations, the length of the first mount ranges from about 15 millimeters to about 30 millimeters.

In some implementations, the width of the first mount ranges from about 5 millimeters to about 10 millimeters.

In some implementations, the first mount comprises a ceramic substrate or a thermoelectric cooler substrate.

In some implementations, the first portion of the micro optics assembly further comprises: at least one third optical component configured to reflect the beam that has passed through the at least one optical isolator toward the at least one second optical component at a particular angle.

In some implementations, the at least one third optical component includes a 90-degree prism having two perpendicular faces forming an angle of 90 degrees.

In some implementations, the at least one third optical component is adjustable to change the particular angle at which the beam is reflected toward the at least one second optical component.

In some implementations, the at least one third optical component is adjustable to change the particular angle between about 0 degrees and about 30 degrees.

In some implementations, the first portion of the micro optics assembly further comprises: an optical circuit chip provided between the at least one second optical component and the optical chip assembly; and at least one fourth optical component provided between the optical circuit chip and the optical chip assembly.

In some implementations, the optical circuit chip includes a photonic integrated circuit chip or a programmable logic controller, and the at least one fourth optical component includes a lens array.

In some implementations, the first portion of the micro optics assembly further comprises: an optical circuit chip provided between the at least one second optical component and the optical chip assembly; and at least one third optical component provided between the optical circuit chip and the optical chip assembly.

In some implementations, the optical circuit chip includes a photonic integrated circuit chip or a programmable logic controller, and the at least one third optical component includes a lens array.

In some implementations, the optical circuit chip is configured to receive the beam after having been directed by the at least one second optical component and is further configured to split the beam into a plurality of beams, and an axis along which the beam is emitted from the light source is offset from respective axes along which the plurality of beams are emitted from the optical circuit chip.

In some implementations, the second mount is wider than the first mount and the first mount is greater in length than the second mount.

In some implementations, the first mount is spaced apart from the second mount in a length direction of the first mount between about 2 mm to about 4 mm.

In some implementations, the second portion of the micro optics assembly further comprises at least one third optical component provided between the at least one second optical component and the optical chip assembly, the at least one first optical component and the at least one second optical component each include a collimating lens formed of a first material, and the at least one third optical component includes a lens array formed of a second material, different from the first material.

In some implementations, the optical chip assembly is configured to amplify the beam to produce an amplified beam, split the amplified beam into a plurality of distributed beams, and emit the plurality of distributed beams toward an object.

For example, in an aspect, the disclosure provides an autonomous vehicle control system for a vehicle. For example, the autonomous vehicle control system includes: one or more processors; and a light detection and ranging (LIDAR) system, the LIDAR system including: a housing defining a cavity having a length defined along a first axis and a width defined along a second axis that is different from the first axis; a first mount positioned at a first portion of the housing within the cavity; a second mount positioned at a second portion of the housing within the cavity; and a micro optics assembly including a first portion of the micro optics assembly provided on the first mount and a second portion of the micro optics assembly provided on the second mount, wherein: the first portion of the micro optics assembly comprises: a light source configured to emit a beam, at least one first optical component configured to direct the beam emitted by the light source, at least one optical isolator configured to allow the beam direct directed by the at least one first optical component to pass through the at least one optical isolator in a first direction and to prevent light from being reflected back into the light source through the at least one optical isolator in a second direction, and at least one second optical component configured to direct the beam after having passed through the at least one optical isolator, and the second portion of the micro optics assembly comprises: an optical chip assembly comprising a plurality of chips configured to receive the beam after having been directed by the at least one second optical component.

For example, in an aspect, the disclosure provides an autonomous vehicle. For example, the autonomous vehicle includes: an autonomous vehicle control system, the autonomous vehicle control system including one or more processors and a light detection and ranging (LIDAR) system, the LIDAR system including: a housing defining a cavity having a length defined along a first axis and a width defined along a second axis that is different from the first axis; a first mount positioned at a first portion of the housing within the cavity; a second mount positioned at a second portion of the housing within the cavity; and a micro optics assembly including a first portion of the micro optics assembly provided on the first mount and a second portion of the micro optics assembly provided on the second mount, wherein: the first portion of the micro optics assembly comprises: a light source configured to emit a beam, at least one first optical component configured to direct the beam emitted by the light source, at least one optical isolator configured to allow the beam directed by the at least one first optical component to pass through the at least one optical isolator in a first direction and to prevent light from being reflected back into the light source through the at least one optical isolator in a second direction, and at least one second optical component configured to direct the beam after having passed through the at least one optical isolator, and the second portion of the micro optics assembly comprises: an optical chip assembly comprising a plurality of chips configured to receive the beam after having been directed by the at least one second optical component.

Other example aspects of the disclosure are directed to other systems, methods, vehicles, apparatuses, tangible non-transitory computer-readable media, and devices for motion prediction and/or operation of a device including a LIDAR system having a particular optic design as described according to examples of the disclosure.

These and other features, aspects and advantages of various implementations of the disclosure will become better understood with reference to the following description and appended claims. The accompanying drawings, which are incorporated in and constitute a part of this specification, illustrate implementations of the disclosure and, together with the description, serve to explain the related principles.

BRIEF DESCRIPTION OF THE DRAWINGS

FIG. 6B depicts a perspective view of optical components of a micro optics assembly mountable in a housing, according to some implementations of the disclosure.

DETAILED DESCRIPTION

The following describes the technology of this disclosure within the context of an autonomous vehicle for example purposes only. As described herein, the technology is not limited to an autonomous vehicle and can be implemented within other robotic and computing systems as well as various devices. For example, the LIDAR systems and methods disclosed herein can be implemented in a variety of ways including, but not limited to, a computer-implemented method, an autonomous vehicle system, an autonomous vehicle control system, a robotic platform system, a general robotic device control system, a computing device, etc.

Figure 1:
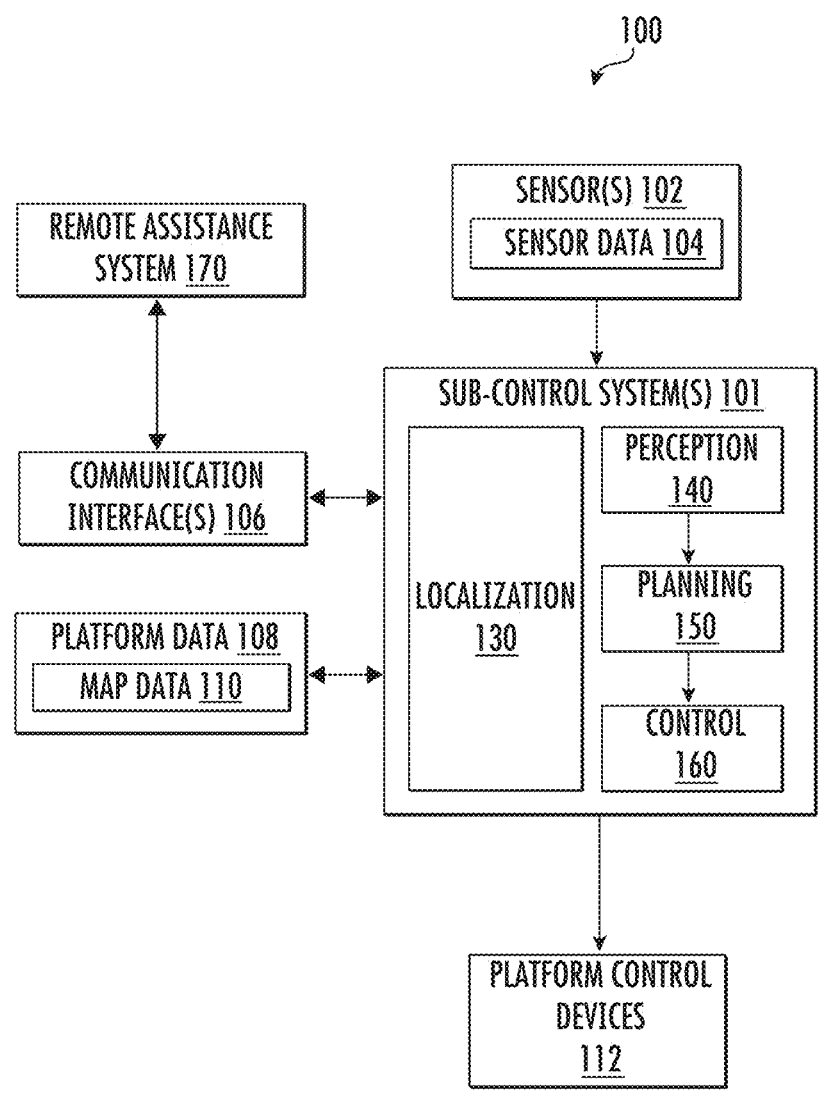
FIG. 1 depicts a block diagram of an example system, according to some implementations of the disclosure.

With reference to FIGS. 1-7C, example implementations of the disclosure are discussed in further detail. FIG. 1 depicts a block diagram of an example autonomous vehicle control system 100 for an autonomous vehicle according to some implementations of the disclosure. The autonomous vehicle control system 100 can be implemented by a computing system of an autonomous vehicle). The autonomous vehicle control system 100 can include one or more sub-control systems 101 that operate to obtain inputs from sensor(s) 102 or other input devices of the autonomous vehicle control system 100. In some implementations, the sub-control system(s) 101 can additionally obtain platform data 108 (e.g., map data 110) from local or remote storage.

The sub-control system(s) 101 can generate control outputs for controlling the autonomous vehicle (e.g., through platform control devices 112, etc.) based on sensor data 104, map data 110, or other data. The sub-control system 101 may include different subsystems for performing various autonomy operations. The subsystems may include a localization system 130, a perception system 140, a planning system 150, and a control system 160. The localization system 130 can determine the location of the autonomous vehicle within its environment; the perception system 140 can detect, classify, and track objects and actors in the environment; the planning system 150 can determine a trajectory for the autonomous vehicle; and the control system 160 can translate the trajectory into vehicle controls for controlling the autonomous vehicle. The sub-control system(s) 101 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the sub-control system(s) 101 can be shared among its subsystems, or a subsystem can have a set of dedicated computing resources.

In some implementations, the autonomous vehicle control system 100 can be implemented for or by an autonomous vehicle (e.g., a ground-based autonomous vehicle). The autonomous vehicle control system 100 can perform various processing techniques on inputs (e.g., the sensor data 104, the map data 110) to perceive and understand the vehicle's surrounding environment and generate an appropriate set of control outputs to implement a vehicle motion plan (e.g., including one or more trajectories) for traversing the vehicle's surrounding environment. In some implementations, an autonomous vehicle implementing the autonomous vehicle control system 100 can drive, navigate, operate, etc. with minimal or no interaction from a human operator (e.g., driver, pilot, etc.).

In some implementations, the autonomous vehicle can be configured to operate in a plurality of operating modes. For instance, the autonomous vehicle can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous vehicle can operate in a semi-autonomous operating mode in which the autonomous vehicle can operate with some input from a human operator present in the autonomous vehicle (or a human operator that is remote from the autonomous platform). In some implementations, the autonomous vehicle can enter into a manual operating mode in which the autonomous vehicle is fully controllable by a human operator (e.g., human driver, etc.) and can be prohibited or disabled (e.g., temporary, permanently, etc.) from performing autonomous navigation (e.g., autonomous driving, etc.). The autonomous vehicle can be configured to operate in other modes such as, for example, park or sleep modes (e.g., for use between tasks such as waiting to provide a trip/service, recharging, etc.). In some implementations, the autonomous vehicle can implement vehicle operating assistance technology (e.g., collision mitigation system, power assist steering, etc.), for example, to help assist the human operator of the autonomous platform (e.g., while in a manual mode, etc.).

The autonomous vehicle control system 100 can be located onboard (e.g., on or within) an autonomous vehicle and can be configured to operate the autonomous vehicle in various environments. The environment may be a real-world environment or a simulated environment. In some implementations, one or more simulation computing devices can simulate one or more of: the sensors 102, the sensor data 104, communication interface(s) 106, the platform data 108, or the platform control devices 112 for simulating operation of the autonomous vehicle control system 100.

In some implementations, the sub-control system(s) 101 can communicate with one or more networks or other systems with communication interface(s) 106. The communication interface(s) 106 can include any suitable components for interfacing with one or more network(s), including, for example, transmitters, receivers, ports, controllers, antennas, or other suitable components that can help facilitate communication. In some implementations, the communication interface(s) 106 can include a plurality of components (e.g., antennas, transmitters, or receivers, etc.) that allow it to implement and utilize various communication techniques (e.g., multiple-input, multiple-output (MIMO) technology, etc.).

In some implementations, the sub-control system(s) 101 can use the communication interface(s) 106 to communicate with one or more computing devices that are remote from the autonomous vehicle over one or more network(s). For instance, in some examples, one or more inputs, data, or functionalities of the sub-control system(s) 101 can be supplemented or substituted by a remote system communicating over the communication interface(s) 106. For instance, in some implementations, the map data 110 can be downloaded over a network to a remote system using the communication interface(s) 106. In some examples, one or more of the localization system 130, the perception system 140, the planning system 150, or the control system 160 can be updated, influenced, nudged, communicated with, etc. by a remote system for assistance, maintenance, situational response override, management, etc.

The sensor(s) 102 can be located onboard the autonomous platform. In some implementations, the sensor(s) 102 can include one or more types of sensor(s). For instance, one or more sensors can include image capturing device(s) (e.g., visible spectrum cameras, infrared cameras, etc.). Additionally or alternatively, the sensor(s) 102 can include one or more depth capturing device(s). For example, the sensor(s) 102 can include one or more LIDAR sensor(s) or Radio Detection and Ranging (RADAR) sensor(s). The sensor(s) 102 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 102 for capturing depth information can be fixed to a rotational device in order to rotate the sensor(s) 102 about an axis. The sensor(s) 102 can be rotated about the axis while capturing data in interval sector packets descriptive of different portions of a three-hundred-and-sixty-degree view of a surrounding environment of the autonomous platform. In some implementations, one or more of the sensor(s) 102 for capturing depth information can be solid state.

The sensor(s) 102 can be configured to capture the sensor data 104 indicating or otherwise being associated with at least a portion of the environment of the autonomous vehicle. The sensor data 104 can include image data (e.g., 2D camera data, video data, etc.), RADAR data, LIDAR data (e.g., 3D point cloud data, etc.), audio data, or other types of data. In some implementations, the sub-control system(s) 101 can obtain input from additional types of sensors, such as inertial measurement units (IMUs), altimeters, inclinometers, odometry devices, location or positioning devices (e.g., GPS, compass), wheel encoders, or other types of sensors. In some implementations, the sub-control system(s) 101 can obtain sensor data 104 associated with a particular component(s) or a system(s) of the autonomous vehicle. This sensor data 104 can indicate, for example, wheel speed, component temperatures, steering angle, cargo or passenger status, etc. In some implementations, the sub-control system(s) 101 can obtain sensor data 104 associated with ambient conditions, such as environmental or weather conditions. In some implementations, the sensor data 104 can include multi-modal sensor data. The multi-modal sensor data can be obtained by at least two different types of sensor(s) (e.g., of the sensors 102) and can indicate static and/or dynamic object(s) or actor(s) within an environment of the autonomous vehicle. The multi-modal sensor data can include at least two types of sensor data (e.g., camera and LIDAR data). In some implementations, the autonomous vehicle can utilize the sensor data 104 for sensors that are remote from (e.g., offboard) the autonomous vehicle. This can include for example, sensor data 104 captured by a different autonomous vehicle.

The sub-control system(s) 101 can obtain the map data 110 associated with an environment in which the autonomous vehicle was, is, or will be located. The map data 110 can provide information about an environment or a geographic area. For example, the map data 110 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous vehicle in understanding its surrounding environment and its relationship thereto. In some implementations, the map data 110 can include high-definition map information. Additionally or alternatively, the map data 110 can include sparse map data (e.g., lane graphs, etc.). In some implementations, the sensor data 104 can be fused with or used to update the map data 110 in real time.

The sub-control system(s) 101 can include the localization system 130, which can provide an autonomous vehicle with an understanding of its location and orientation in an environment. In some examples, the localization system 130 can support one or more other subsystems of the sub-control system(s) 101, such as by providing a unified local reference frame for performing, e.g., perception operations, planning operations, or control operations.

In some implementations, the localization system 130 can determine the current position of the autonomous vehicle. A current position can include a global position (e.g., respecting a georeferenced anchor, etc.) or relative position (e.g., respecting objects in the environment, etc.). The localization system 130 can generally include or interface with any device or circuitry for analyzing a position or change in position of an autonomous vehicle. For example, the localization system 130 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous vehicle can be used by various subsystems of the sub-control system(s) 101 or provided to a remote computing system (e.g., using the communication interface(s) 106).

In some implementations, the localization system 130 can register relative positions of elements of a surrounding environment of the autonomous vehicle with recorded positions in the map data 110. For instance, the localization system 130 can process the sensor data 104 (e.g., LIDAR data, RADAR data, camera data, etc.) for aligning or otherwise registering to a map of the surrounding environment (e.g., from the map data 110) to understand the autonomous vehicle's position within that environment. Accordingly, in some implementations, the autonomous vehicle can identify its position within the surrounding environment (e.g., across six axes, etc.) based on a search over the map data 110. In some implementations, given an initial location, the localization system 130 can update the autonomous vehicle's location with incremental re-alignment based on recorded or estimated deviations from the initial location. In some implementations, a position can be registered directly within the map data 110.

In some implementations, the map data 110 can include a large volume of data subdivided into geographic tiles, such that a desired region of a map stored in the map data 110 can be reconstructed from one or more tiles. For instance, a plurality of tiles selected from the map data 110 can be stitched together by the sub-control system 101 based on a position obtained by the localization system 130 (e.g., a number of tiles selected in the vicinity of the position).

In some implementations, the localization system 130 can determine positions (e.g., relative or absolute) of one or more attachments or accessories for an autonomous vehicle. For instance, an autonomous vehicle can be associated with a cargo platform, and the localization system 130 can provide positions of one or more points on the cargo platform. For example, a cargo platform can include a trailer or other device towed or otherwise attached to or manipulated by an autonomous vehicle, and the localization system 130 can provide for data describing the position (e.g., absolute, relative, etc.) of the autonomous vehicle as well as the cargo platform. Such information can be obtained by the other autonomy systems to help operate the autonomous vehicle.

The sub-control system(s) 101 can include the perception system 140, which can allow an autonomous platform to detect, classify, and track objects and actors in its environment. Environmental features or objects perceived within an environment can be those within the field of view of the sensor(s) 102 or predicted to be occluded from the sensor(s) 102. This can include object(s) not in motion or not predicted to move (static objects) or object(s) in motion or predicted to be in motion (dynamic objects/actors).

The perception system 140 can determine one or more states (e.g., current or past state(s), etc.) of one or more objects that are within a surrounding environment of an autonomous vehicle. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 140 can determine the state(s) using one or more algorithms or machine-learned models configured to identify/classify objects based on inputs from the sensor(s) 102. The perception system can use different modalities of the sensor data 104 to generate a representation of the environment to be processed by the one or more algorithms or machine-learned models. In some implementations, state(s) for one or more identified or unidentified objects can be maintained and updated over time as the autonomous vehicle continues to perceive or interact with the objects (e.g., maneuver with or around, yield to, etc.). In this manner, the perception system 140 can provide an understanding about a current state of an environment (e.g., including the objects therein, etc.) informed by a record of prior states of the environment (e.g., including movement histories for the objects therein). Such information can be helpful as the autonomous vehicle plans its motion through the environment.

The sub-control system(s) 101 can include the planning system 150, which can be configured to determine how the autonomous platform is to interact with and move within its environment. The planning system 150 can determine one or more motion plans for an autonomous platform. A motion plan can include one or more trajectories (e.g., motion trajectories) that indicate a path for an autonomous vehicle to follow. A trajectory can be of a certain length or time range. The length or time range can be defined by the computational planning horizon of the planning system 150. A motion trajectory can be defined by one or more waypoints (with associated coordinates). The waypoint(s) can be future location(s) for the autonomous platform. The motion plans can be continuously generated, updated, and considered by the planning system 150.

The planning system 150 can determine a strategy for the autonomous platform. A strategy may be a set of discrete decisions (e.g., yield to actor, reverse yield to actor, merge, lane change) that the autonomous platform makes. The strategy may be selected from a plurality of potential strategies. The selected strategy may be a lowest cost strategy as determined by one or more cost functions. The cost functions may, for example, evaluate the probability of a collision with another actor or object.

The planning system 150 can determine a desired trajectory for executing a strategy. For instance, the planning system 150 can obtain one or more trajectories for executing one or more strategies. The planning system 150 can evaluate trajectories or strategies (e.g., with scores, costs, rewards, constraints, etc.) and rank them. For instance, the planning system 150 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 150 can utilize static cost(s) to evaluate trajectories for the autonomous platform (e.g., "avoid lane boundaries," "minimize jerk," etc.). Additionally or alternatively, the planning system 150 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 150 can rank trajectories based on one or more static costs, one or more dynamic costs, or a combination thereof. The planning system 150 can select a motion plan (and a corresponding trajectory) based on a ranking of a plurality of candidate trajectories. In some implementations, the planning system 150 can select a highest ranked candidate, or a highest ranked feasible candidate.

The planning system 150 can then validate the selected trajectory against one or more constraints before the trajectory is executed by the autonomous platform.

To help with its motion planning decisions, the planning system 150 can be configured to perform a forecasting function. The planning system 150 can forecast one or more future state(s) of the environment. This can include forecasting the future state(s) of other actors in the environment. In some implementations, the planning system 150 can forecast future state(s) based on current or past state(s) (e.g., as developed or maintained by the perception system 140). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous vehicle. Additionally or alternatively, the probabilities can include probabilities conditioned on trajectory options available to one or more other actors.

To implement selected motion plan(s), the sub-control system(s) 101 can include a control system 160 (e.g., a vehicle control system). Generally, the control system 160 can provide an interface between the sub-control system(s) 101 and the platform control devices 112 for implementing the strategies and motion plan(s) generated by the planning system 150. For instance, the control system 160 can implement the selected motion plan/trajectory to control the autonomous platform's motion through its environment by following the selected trajectory (e.g., the waypoints included therein). The control system 160 can, for example, translate a motion plan into instructions for the appropriate platform control devices 112 (e.g., acceleration control, brake control, steering control, etc.). By way of example, the control system 160 can translate a selected motion plan into instructions to adjust a steering component (e.g., a steering angle) by a certain number of degrees, apply a certain magnitude of braking force, increase/decrease speed, etc. In some implementations, the control system 160 can communicate with the platform control devices 112 through communication channels including, for example, one or more data buses (e.g., controller area network (CAN), etc.), onboard diagnostics connectors (e.g., OBD-II, etc.), or a combination of wired or wireless communication links. The platform control devices 112 can send or obtain data, messages, signals, etc. to or from the sub-control system(s) 101 (or vice versa) through the communication channel(s).

The sub-control system(s) 101 can receive, through communication interface(s) 106, assistive signal(s) from remote assistance system 170. Remote assistance system 170 can communicate with the sub-control system(s) 101 over a network. In some implementations, the sub-control system(s) 101 can initiate a communication session with the remote assistance system 170. For example, the sub-control system(s) 101 can initiate a session based on or in response to a trigger. In some implementations, the trigger may be an alert, an error signal, a map feature, a request, a location, a traffic condition, a road condition, etc.

After initiating the session, the sub-control system(s) 101 can provide context data to the remote assistance system 170. The context data may include sensor data 104 and state data of the autonomous vehicle. For example, the context data may include a live camera feed from a camera of the autonomous vehicle and the autonomous vehicle's current speed. An operator (e.g., human operator) of the remote assistance system 170 can use the context data to select assistive signals. The assistive signal(s) can provide values or adjustments for various operational parameters or characteristics for the sub-control system(s) 101. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the sub-control system(s) 101.

The sub-control system(s) 101 can use the assistive signal(s) for input into one or more autonomy subsystems for performing autonomy functions. For instance, the planning system 150 can receive the assistive signal(s) as an input for generating a motion plan. For example, assistive signal(s) can include constraints for generating a motion plan. Additionally or alternatively, assistive signal(s) can include cost or reward adjustments for influencing motion planning by the planning system 150. Additionally or alternatively, assistive signal(s) can be considered by the sub-control system(s) 101 as suggestive inputs for consideration in addition to other received data (e.g., sensor inputs, etc.).

The sub-control system(s) 101 may be platform agnostic, and the control system 160 can provide control instructions to platform control devices 112 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 2:
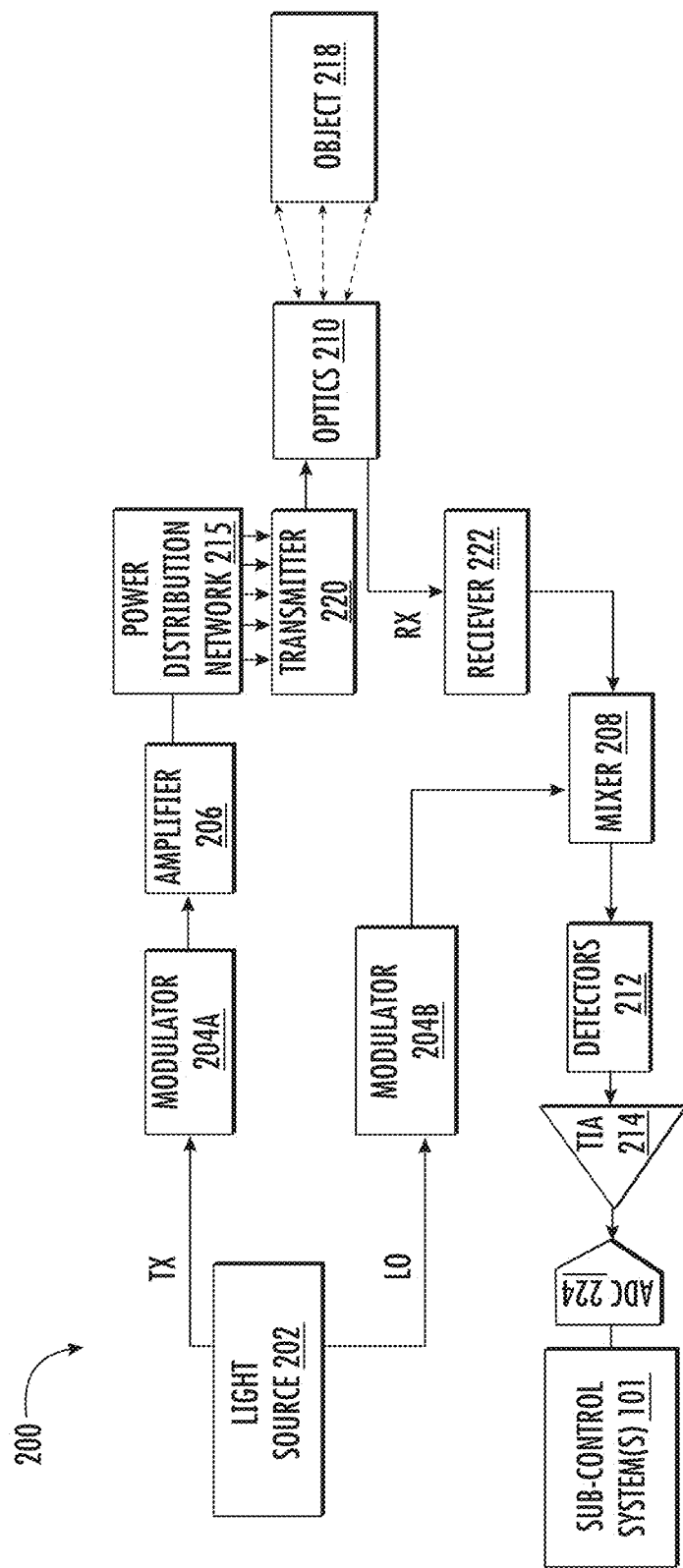
FIG. 2 depicts a block diagram of an example LIDAR system, according to some implementations of the disclosure.

FIG. 2 is a block diagram illustrating an example environment of a LIDAR sensor system for autonomous vehicles, according to some implementations. The environment includes a LIDAR sensor system 200 that includes a transmit (Tx) path and a receive (Rx) path. The Tx path includes one or more Tx input/output ports, and the Rx path includes one or more Rx input/output ports. In some implementations, a semiconductor substrate and/or semiconductor package may include the Tx path and the Rx. In some implementations, the semiconductor substrate and/or semiconductor package may include at least one of silicon photonics circuitry, programmable logic controller (PLC), or III-V semiconductor circuitry.

In some implementations, a first semiconductor substrate and/or a first semiconductor package may include the Tx path and a second semiconductor substrate and/or a second semiconductor package may include the Rx path. In some arrangements, the Rx input/output ports and/or the Tx input/output ports may occur (or be formed/disposed/located/placed) along one or more edges of one or more semiconductor substrates and/or semiconductor packages.

The LIDAR sensor system 200 includes one or more transmitters 220 and one or more receivers 222. The LIDAR sensor system 200 further includes one or more optics 210 (e.g., an oscillatory scanner, a unidirectional scanner, a Risley prism, a circulator optic, and/or a beam collimator, etc.) that are coupled to the LIDAR sensor system 200 (e.g., the transmitter 220 and/or receiver 222). In some implementations, the one or more optics 210 may be coupled to the Tx path via the one or more Tx input/output ports. In some implementations, the one or more optics 210 may be coupled to the Rx path via the one or more Rx input/output ports.

The LIDAR sensor system 200 can be coupled to one or more sub-control system(s) 101 (e.g., the sub-control system(s) 101 of FIG. 1). In some implementations, the sub-control system(s) 101 may be coupled to the Rx path via the one or more Rx input/output ports. For instance, the sub-control system(s) 101 can receive LIDAR outputs from the LIDAR sensor system 200. The sub-control system(s) 101 can control a vehicle (e.g., an autonomous vehicle) based on the LIDAR outputs.

The Tx path may include a light source 202, a modulator 204A, a modulator 204B, an amplifier 206, and one or more transmitters 220. The Rx path may include one or more receivers 222, a mixer 208, a detector 212, a transimpedance amplifier (TIA) 214, and one or more analog-to-digital converters (ADCs). Although FIG. 2 shows only a select number of components, the LIDAR sensor system 200 may include any number of components and/or input/output channels (in any combination) that are interconnected in any arrangement to facilitate combining multiple functions of a LIDAR system, to support the operation of a vehicle.

The light source 202 may be configured to generate a light signal (or beam) that is derived from (or associated with) a local oscillator (LO) signal. In some implementations, the light signal may have an operating wavelength that is equal to or substantially equal to about 1550 nanometers. In some implementations, the light signal may have an operating wavelength that is between about 1400 nanometers and about 1600 nanometers.

The light source 202 may be configured to provide the light signal to the modulator 204A, which is configured to modulate a phase and/or a frequency of the light signal based on a first radio frequency (RF) signal (e.g., an "RF1" signal) to generate a modulated light signal, such as by Continuous Wave (CW) modulation or quasi-CW modulation. The modulator 204A may be configured to send the modulated light signal to the amplifier 206. The amplifier 206 may be configured to amplify the modulated light signal to generate an amplified light signal. The amplified light signal can be provided to the power distribution network 215. The power distribution network 215 can split the amplified light signal into a plurality of beams that are provided to the optics 210 via the one or more transmitters 220. The one or more transmitters 220 may include one or more optical waveguides or antennas. In some implementations, modulator 204A and/or modulator 204B may have a bandwidth between 400 megahertz (MHz) and 1000 (MHz).

The optics 210 may be configured to steer the amplified light signal(s) that it receives from the Tx path into an environment within a given field of view toward an object 218, may receive a returned signal reflected back from the object 218, and provide the returned signal to the mixer 208 of the Rx path via the one or more receivers 222. The one or more receivers 222 may include one or more optical waveguides or antennas. In some arrangements, the transmitters 220 and the receivers 222 may collectively constitute one or more transceivers. In some arrangements, the one or more transceivers may include a monostatic transceiver or a bistatic transceiver.

The light source 202 may be configured to provide the LO signal to the modulator 204B, which is configured to modulate a phase and/or a frequency of the LO signal based on a second RF signal (e.g., an "RF2" signal) to generate a modulated LO signal (e.g., using Continuous Wave (CW) modulation or quasi-CW modulation) and send the modulated LO signal to the mixer 208 of the Rx path. The mixer 208 may be configured to mix (e.g., combine, multiply, etc.) the modulated LO signal with the returned signal to generate a down-converted signal and send the down-converted signal to the detector 212.

In some arrangements, the mixer 208 may be configured to send the modulated LO signal to the detector 212. The detector 212 may be configured to generate an electrical signal based on the down-converted signal and send the electrical signal to the TIA 214. In some arrangements, the detector 212 may be configured to generate an electrical signal based on the down-converted signal and the modulated signal. The TIA 214 may be configured to amplify the electrical signal and send the amplified electrical signal to the sub-control system(s) 101 via the one or more ADCs 224. In some implementations, the TIA 214 may have a peak noise-equivalent power (NEP) that is less than 5 picowatts per square root Hertz (i.e., 5×10-12 Watts per square root Hertz). In some implementations, the TIA 214 may have a gain between 4 kiloohms and 25 kiloohms. In some implementations, detector 212 and/or TIA 214 may have a 3-decibel bandwidth between 80 kilohertz (kHz) and 450 megahertz (MHz).

The sub-control system(s) 101 may be configured to determine a distance to the object 218 and/or measure the velocity of the object 218 based on the one or more electrical signals that it receives from the TIA via the one or more ADCs 224.

Figure 3A:
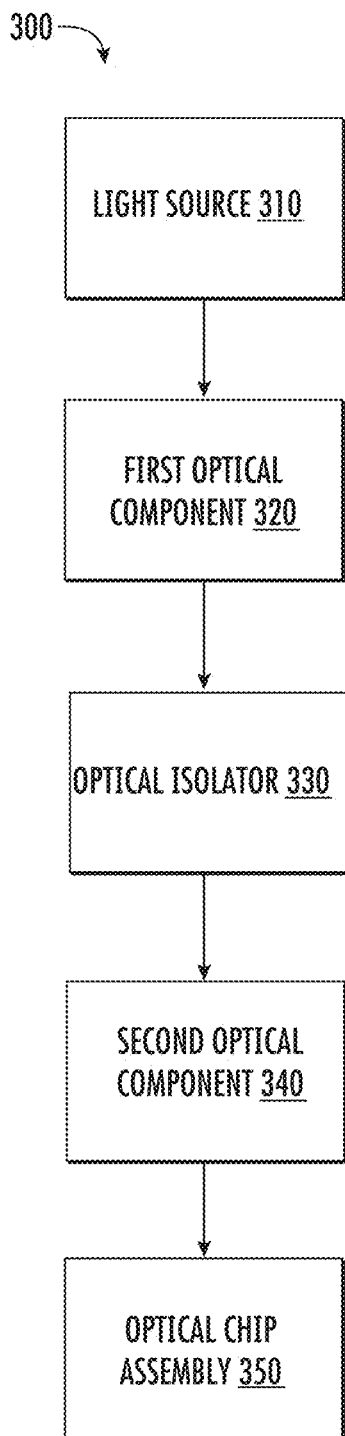
FIGS. 3A through 3C depict example micro optics assemblies for a LIDAR system, according to some implementations of the disclosure.
Figure 3B:
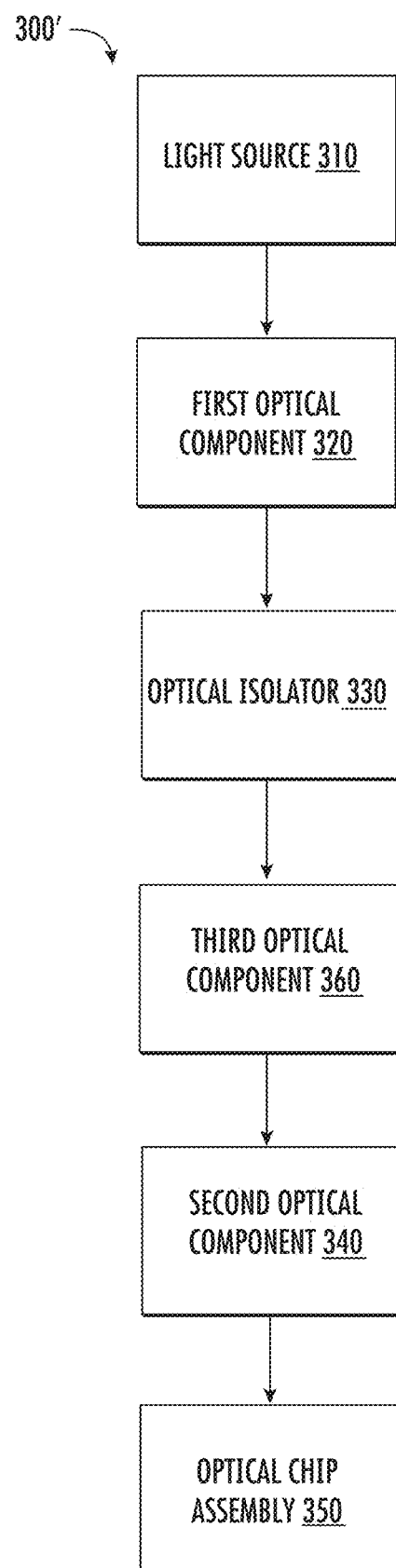
Figure 3C:
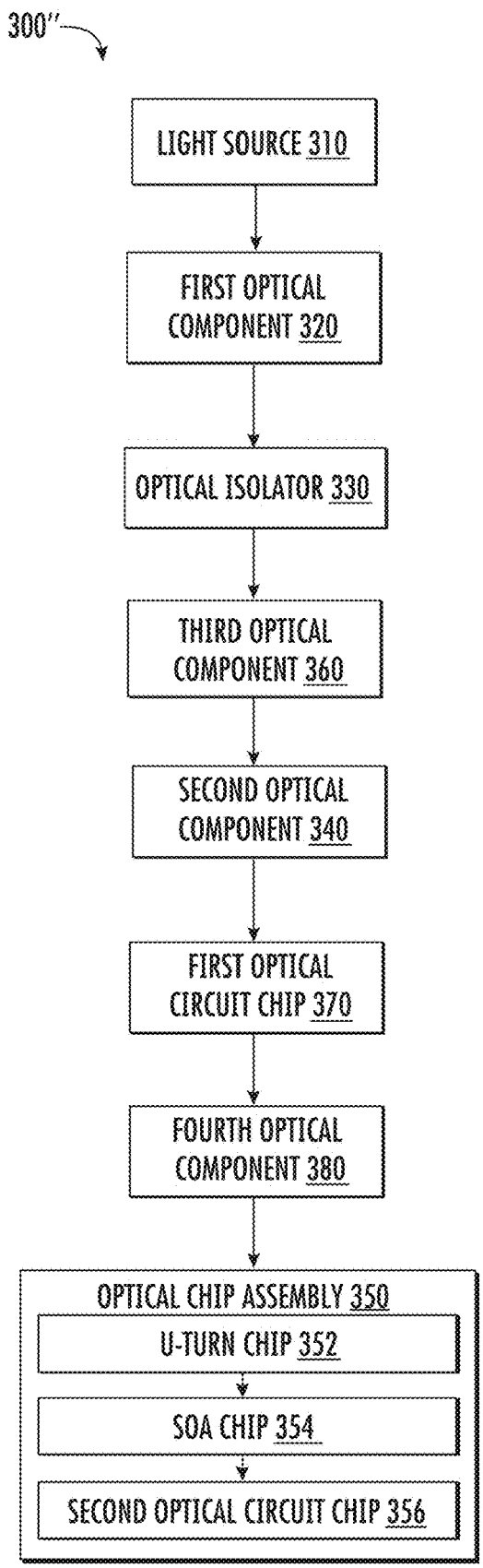

FIGS. 3A through 3C depict example micro optics assemblies for a LIDAR system, according to some implementations of the disclosure.

FIG. 3A depicts an example micro optics assembly for a LIDAR system, according to example embodiments of the disclosure. In FIG. 3A, the micro optics assembly 300 includes a light source 310, a first optical component 320, an optical isolator 330, a second optical component 340, and an optical chip assembly 350. The micro optics assembly 300 may be implemented in a LIDAR system and may include various components from FIG. 2.

For example, the light source 310 may correspond to light source 202. The light source 310 may be configured to generate a light signal (or beam) that is derived from (or associated with) a local oscillator (LO) signal. In some implementations, the light signal may have an operating wavelength that is equal to or substantially equal to about 1550 nanometers. In some implementations, the light signal may have an operating wavelength that is between about 1400 nanometers and about 1600 nanometers. The light source 310 may be configured to emit a light beam which includes a plurality of light rays.

The first optical component 320 may be configured to receive the light beam emitted by the light source 310 to the first optical component 320. The first optical component 320 may include a lens, for example a collimating lens. In some implementations the first optical component can include one or more optic components including an oscillatory scanner, a unidirectional scanner, a Risley prism, a circulator optic, and/or a beam collimator, etc.

The first optical component 320 may be configured to direct the light beam which is received from the light source 310. For example, the first optical component 320 may be shaped and positioned so that it refracts (bends) the incoming light beam in a specific manner. The first optical component 320 may be configured to direct the light rays within the light beam to be parallel with one another.

The optical isolator 330 may be configured to receive the directed light beam output (transmitted) by the first optical component 320 to the optical isolator 330. The optical isolator 330 may be configured to allow the light beam directed by the first optical component 320 to pass through the optical isolator 330 in a first direction and to prevent light from being reflected back into the light source 310 through the optical isolator 330 in a second direction (e.g., opposite to the first direction).

The optical isolator 330 can include one or more tunable components or active components, such as, for example, phase modulators, frequency modulators, and so on. The optical isolator 330 can be controlled by one or more control signals (e.g., via a control signal line) to modify the signals propagating through the optical isolator 330.

The second optical component 340 may be configured to direct the light beam after the light beam passes through the optical isolator 330. Similar to first optical component 320, the second optical component 340 may include a lens, for example a collimating lens. In some implementations the first optical component can include one or more optic components including an oscillatory scanner, a unidirectional scanner, a Risley prism, a circulator optic, and/or a beam collimator, etc.

In some implementations, the second optical component 340 may be configured to direct the light beam which is received from the optical isolator 330. For example, the second optical component 340 may be shaped and positioned so that it refracts (bends) the incoming light beam in a specific manner. The second optical component 340 may be configured to direct the light rays within the light beam to be parallel with one another.

The optical chip assembly 350 may be configured to receive the directed light beam output (transmitted) by the second optical component 340 to the optical chip assembly 350. In some implementations, the optical chip assembly 350 includes a plurality of chips configured to receive the light beam after having been directed by the second optical component 340. In some implementations, the optical chip assembly 350 may be configured to emit the beam toward an object in the environment of the vehicle (e.g., object 218 in FIG. 2). For example, a receiver (e.g., receiver 222 from FIG. 2) may be configured to receive a reflected beam from the object.

In some implementations, the plurality of chips included in the optical chip assembly 350 may include two or more chips (e.g., three chips) stacked together in a sequential arrangement. For example, the optical chip assembly may include a semiconductor optical amplifier (SOA) chip, a U-turn chip, an optical circuit chip (e.g., a photonic integrated circuit chip or a programmable logic controller), and the like. In some implementations, one or more of the chips in the optical chip assembly (e.g., the U-turn chip 352 and the second optical circuit chip 356) can be or include a silicon photonics die. Other chips (e.g., the SOA chip 354) can be or include a group III-V semiconductor die. A group III-V semiconductor die can include a group III-V semiconductor material, for example, indium phosphide (InP), gallium arsenide (GaAs), indium arsenide (InAs), gallium nitride (GaN), or indium antimonide (InSb). Group III-V semiconductors are based on the elements of groups III and V of the periodic table. The possibility to grow thin-films made of group III-V alloys with different fractions of their constituent elements allows for precise engineering of optical properties. In addition, since many III-V compounds are direct-bandgap semiconductors, they may be suitable for the development of photonic devices and integrated circuits for use in optical systems such as LIDAR systems. These example chips will be described in more detail herein. In some implementations, the optical chip assembly 350 may be configured to amplify the light beam to produce an amplified beam, split the amplified light beam into a plurality of distributed light beams, and emit the plurality of distributed light beams toward the object.

FIG. 3B depicts an example micro optics assembly for a LIDAR system, according to example embodiments of the disclosure. In FIG. 3B, the micro optics assembly 300' includes a light source 310, a first optical component 320, an optical isolator 330, a third optical component 360, a second optical component 340, and an optical chip assembly 350. The micro optics assembly 300' may be implemented in a LIDAR system and may include various components from FIG. 2, for example.

The light source 310, the first optical component 320, the optical isolator 330, the second optical component 340, and the optical chip assembly 350 have already been described herein and descriptions thereof will not be repeated for the sake of brevity. Different from FIG. 3A, the third optical component 360 may be provided between the optical isolator 330 and the second optical component 340.

The optical isolator 330 may be configured to receive the directed light beam output (transmitted) by the first optical component 320 to the optical isolator 330. The optical isolator 330 may be configured to allow the light beam directed by the first optical component 320 to pass through the optical isolator 330 in a first direction and to prevent light from being reflected back into the light source 310 through the optical isolator 330 in a second direction (e.g., opposite to the first direction).

In FIG. 3B, the third optical component 360 may be configured to receive the light beam that has passed through the optical isolator 330 and reflect the light beam toward the second optical component 340 at a particular angle. In some implementations, the third optical component 360 can include one or more prisms, mirrors (e.g., rotating mirrors, dichroic mirrors, polygonal mirrors, etc.), beam splitters, deflectors, etc. For example, the third optical component 360 may be configured to be adjustable to change the particular angle at which the light beam is reflected toward the second optical component 340. In some implementations, the particular angle may be adjustable between 0 degrees to 30 degrees, between 15 degrees to 25 degrees, etc., In some implementations, the third optical component 360 may include a plurality of optical devices or components. For example, the third optical component 360 may include a plurality of prisms. For example, the plurality of prisms may be separated from one another or may be cemented or adhered to each other. In some implementations, the plurality of prisms may include a 90-degree prism (right-angle prism) having the shape of a triangular prism having two perpendicular faces forming an angle of 90 degrees. Other types of prism may also be implemented to direct the light beam (e.g., a wedge prism).

The second optical component 340 may be configured to direct the light beam after the light beam is reflected by the third optical component 360. In some implementations, the second optical component 340 may be configured to direct the light beam which is received from the third optical component 360. For example, the second optical component 340 may be shaped and positioned so that it refracts (bends) the incoming light beam in a specific manner.

FIG. 3C depicts an example micro optics assembly for a LIDAR system, according to example embodiments of the disclosure. In FIG. 3C, the micro optics assembly 300" includes a light source 310, a first optical component 320, an optical isolator 330, a third optical component 360, a second optical component 340, a first optical circuit chip 370, a fourth optical component 380, and an optical chip assembly 350. The micro optics assembly 300" may be implemented in a LIDAR system and may include various components from FIG. 2, for example.

The light source 310, the first optical component 320, the optical isolator 330, the second optical component 340, the third optical component 360, and the optical chip assembly 350 have already been described herein and descriptions thereof will not be repeated for the sake of brevity. Different from FIGS. 3A and 3B, the first optical circuit chip 370 and the fourth optical component 380 may be provided between the second optical component 340 and the optical chip assembly 350.

In FIG. 3C, the second optical component 340 may be configured to direct the light beam after the light beam is reflected by the third optical component 360. In some implementations, the second optical component 340 may be configured to direct the light beam which is received from the third optical component 360 and direct (transmit) the directed light beam to the first optical circuit chip 370. For example, the second optical component 340 may be shaped and positioned so that it refracts (bends) the incoming light beam in a specific manner to the first optical circuit chip 370.

For example, the first optical circuit chip 370 may include a photonic integrated circuit chip or a programmable logic controller. In some implementations, the first optical circuit chip 370 may be configured to serve as a modulator, for example a modulator waveguide. In some implementations, the first optical circuit chip 370 may be configured to encode a signal onto the light beam and form a plurality of data streams (a plurality of light beams).

In some implementations, the fourth optical component 380 is provided between the first optical circuit chip 370 and the optical chip assembly 350. The fourth optical component 380 may be configured to direct the light beam(s) after having passed through a further optical circuit chip to focus the light beam(s) onto the optical chip assembly 350.

In some implementations, the fourth optical component 380 may include a plurality of lens arrays. For example, the lens arrays may be configured to shape and collimate the light beam(s) before the light beam(s) are transmitted to the optical chip assembly 350. In some implementations, the fourth optical component 380 (e.g., a plurality of lens arrays) may be formed of a different material than the first optical component 320 and/or the second optical component 340. For example, the fourth optical component 380 may be formed of silicon while the first optical component 320 and/or the second optical component 340 may be formed of glass. In some implementations, the fourth optical component 380 can be configured to direct the beam(s) after having passed through the first optical circuit chip 370 to focus the light beam(s) onto the U-turn chip 352.

Although not shown in FIG. 3C, in some implementations, the micro optics assembly 300" can also include at least one further optical isolator provided between the first optical circuit chip 370 and the optical chip assembly 350. For example, similar to the optical isolator 330 being disposed between the first optical component 320 and the second optical component 340, the further optical isolator can be provided between a first lens array and a second lens array which constitute the fourth optical component 380. The further optical isolator may be configured to allow the light beam directed by the first lens array to pass through the further optical isolator in a first direction and to prevent light from being reflected back through the further optical isolator in a second direction (e.g., opposite to the first direction). The second lens array may be configured to direct the light beam after the light beam passes through the further optical isolator.

In FIG. 3C, the optical chip assembly 350 may be configured to receive the directed light beam output (transmitted) by the fourth optical component 380 to the optical chip assembly 350. In some implementations, the optical chip assembly 350 includes a plurality of chips configured to receive the light beam after having been directed by the second optical component 340. In some implementations, the optical chip assembly 350 may be configured to emit the beam toward an object in the environment of the vehicle (e.g., the object 218 in FIG. 2). For example, a receiver (e.g., receiver 222 from FIG. 2) may be configured to receive a reflected beam from the object.

As shown in FIG. 3C, the plurality of chips included in the optical chip assembly 350 may include a U-turn chip 352, a semiconductor optical amplifier (SOA) chip 354, and a second optical circuit chip 356 (e.g., a photonic integrated circuit chip or a programmable logic controller).

FIGS. 4A through 4E depict example structural configurations of a micro optics assembly, according to example embodiments of the disclosure.

Figure 4A:
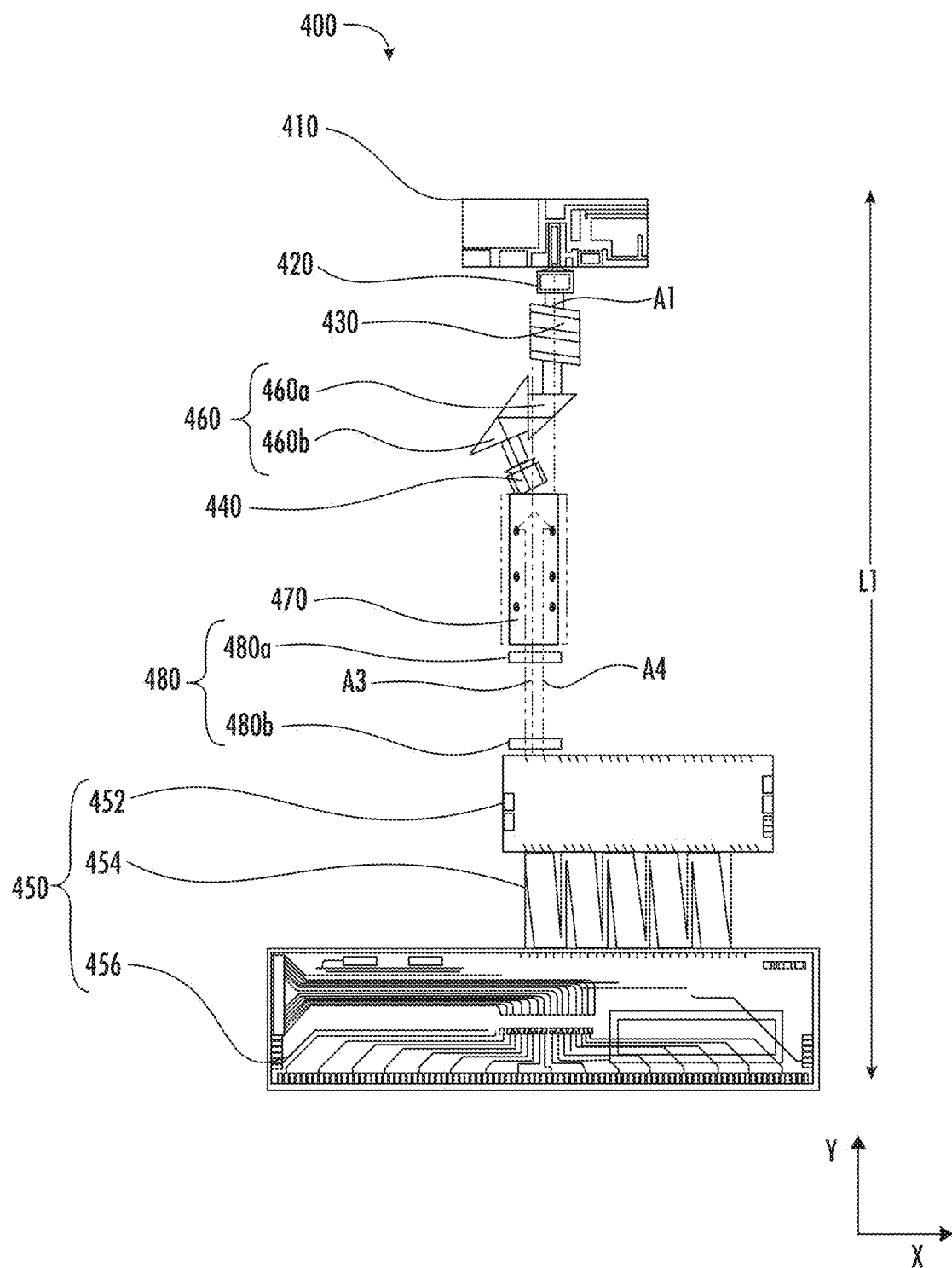
FIGS. 4A through 4E depict example structural configurations of a micro optics assembly, according to some implementations of the disclosure.
Figure 4B:
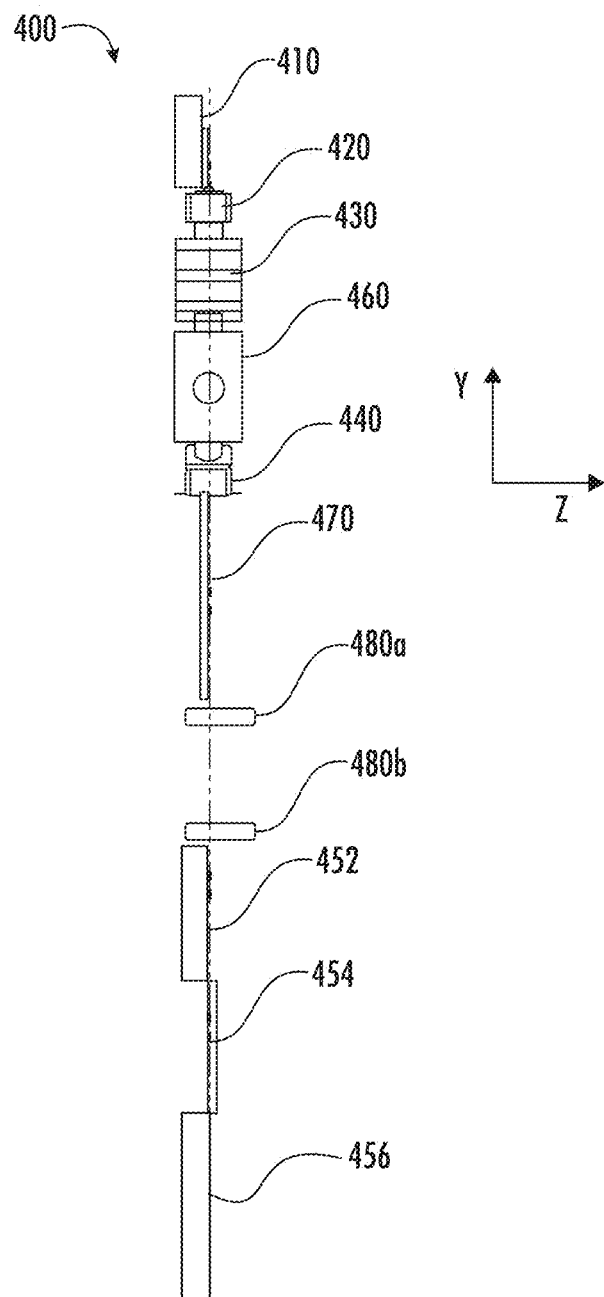
Figure 4C:
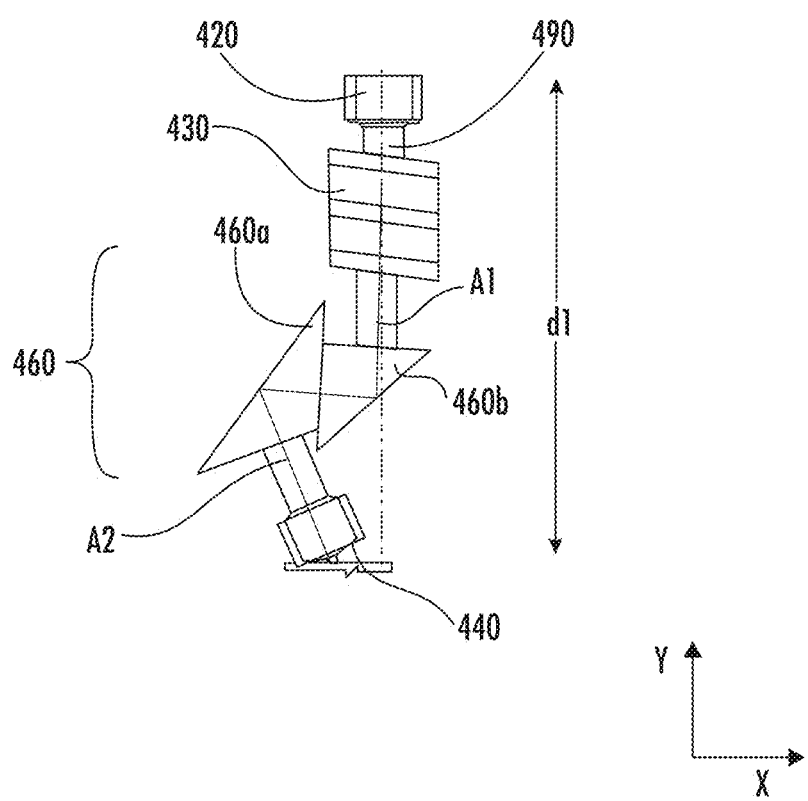
Figure 4D:
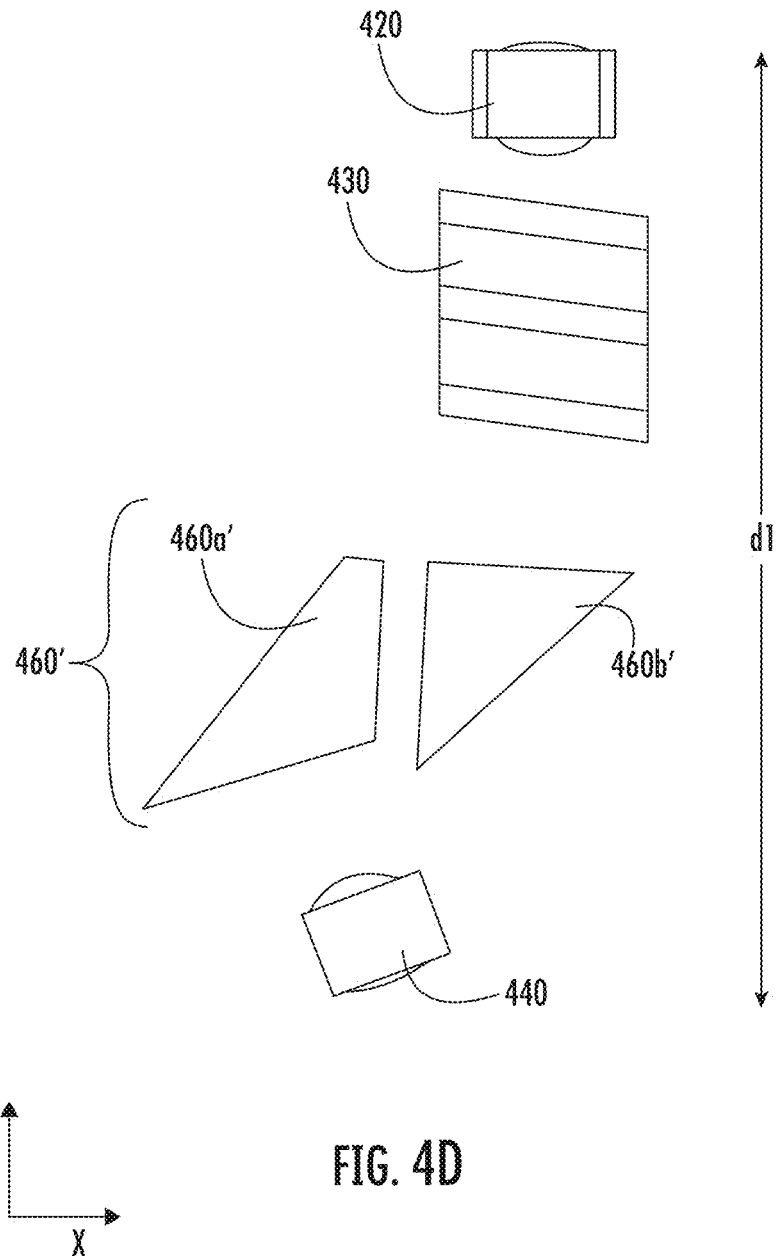
Figure 4E:
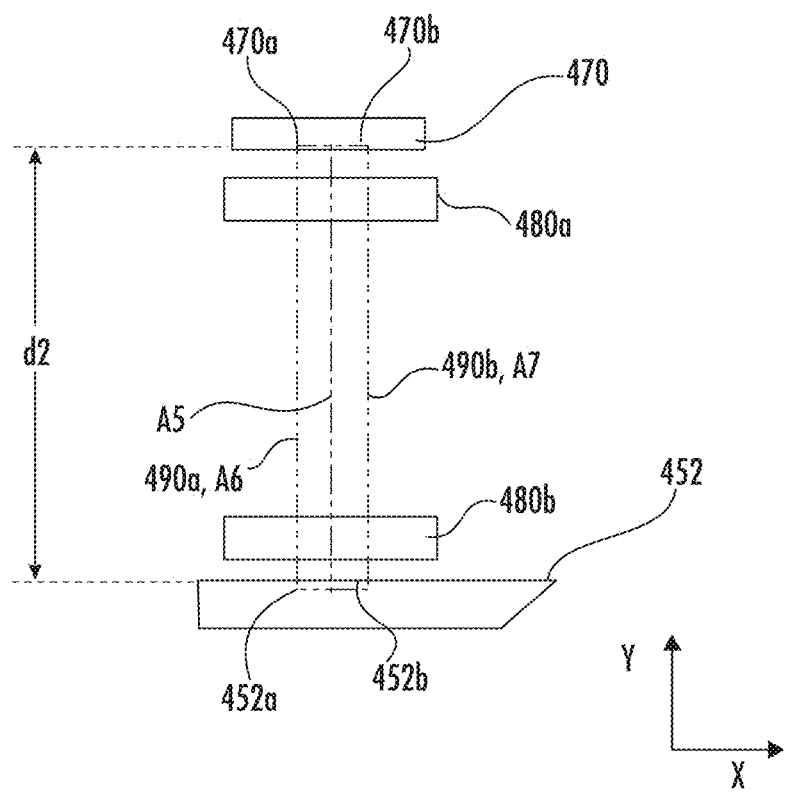

FIG. 4A depicts an example structural configuration of a micro optics assembly from a plan view, according to example embodiments of the disclosure. FIG. 4B depicts an example structural configuration of a micro optics assembly from a side view, according to example embodiments of the disclosure. FIGS. 4C-4D depict example structural configurations of optical components, according to example embodiments of the disclosure. FIG. 4E depicts an example structural configuration of a third optical component, according to example embodiments of the disclosure.

Referring to FIGS. 4A and 4B, the micro optics assembly 400 has a width which extends in the width direction X, a length which extends in the longitudinal direction Y, and a depth or height in the direction Z.

As shown in FIGS. 4A and 4B, the micro optics assembly 400 includes a light source 410, a first optical component 420, an optical isolator 430, a second optical component 440, a third optical component 460, a first optical circuit chip 470, a fourth optical component 480, and an optical chip assembly 450. The light source 410, the first optical component 420, the optical isolator 430, the second optical component 440, the third optical component 460, the first optical circuit chip 470, the fourth optical component 480, and the optical chip assembly 450 correspond respectively to the light source 310, the first optical component 320, the optical isolator 330, the second optical component 340, the third optical component 360, the first optical circuit chip 370, the fourth optical component 380, and the optical chip assembly 350 as shown in FIG. 3C, and descriptions thereof will not be repeated for the sake of brevity.

In some implementations, an overall length L1 of the micro optics assembly 400 as shown in FIG. 4A may be about 27 mm, or about 24 mm to 30 mm. In some implementations where various components are omitted (e.g., as described with respect to FIGS. 3A and 3B), an overall length of the micro optics assembly may be less. For example, when the first optical circuit chip 470 and the fourth optical component 480 are omitted (similar to the configuration of FIG. 3B), an overall length of the micro optics assembly may be about 19 mm, or about 16 mm to 22 mm. For example, when the third optical component 460, the first optical circuit chip 470, and the fourth optical component 480 are omitted (similar to the configuration of FIG. 3A), an overall length of the micro optics assembly may be about 15 mm, or about 12 mm to 18 mm.

The optical chip assembly 450 may include a plurality of two or more chips stacked together in a particular arrangement. For example, as illustrated in FIG. 4A, the optical chip assembly may include a first chip corresponding to a U-turn chip 452, a second chip corresponding to a SOA chip 454, and a third chip corresponding to a second optical circuit chip 456. In some implementations, the optical chip assembly 450 may have the widest width compared to other components of the micro optics assembly 400 as shown in FIG. 4A. For example, the second optical circuit chip 456 may be about 16 mm wide, or about 13 mm to 19 mm wide, the U-turn chip 452 may be about 6 mm wide, or about 4 mm to 8 mm wide, and the SOA chip 454 may be about 8 mm wide, or about 6 mm to 10 mm wide. In some implementations, the U-turn chip 452, the SOA chip 454 (e.g., a photonic integrated circuit chip or a programmable logic controller), and the second optical circuit chip 456 may be stacked sequentially with respect to each other to form a "chip sandwich". For example, a first side of the U-turn chip 452 faces in a direction toward the second optical component 440 and the fourth optical component 480 and a second side of the U-turn chip 452 faces in a direction toward a first side of the SOA chip 454 and a first side of the second optical circuit chip 456. The second side of the SOA chip 454 faces the first side of the second optical circuit chip 456.

As depicted in FIG. 4A, the light source 410 may emit a light beam along an axis A1 in the longitudinal direction Y. In some implementations in which the third optical component 460 is employed, the light beam may be deflected in various directions via a plurality of optical devices or components (e.g., the first prism 460a and the second prism 460b). For example, the light beam may be emitted to the second optical component 440 along the axis A2 which is transverse or oblique to the axis A1. As described herein, the first optical circuit chip 470 may be configured to split the light beam into a plurality of light beams and the plurality of light beams may be emitted along a plurality of axes (e.g., axes A3 and A4) in the longitudinal direction Y (parallel to the axis A1) to the optical chip assembly 450 via the fourth optical component 480. For example, the plurality of axes may be offset from the axis A1 in the width direction X (e.g., by about 0.5 mm to 1.5 mm, for example by 0.66 mm).

FIGS. 4C-4D depict example structural configurations of optical components, according to example embodiments of the disclosure. For example, in FIG. 4C, the third optical component 460 includes a plurality of optical devices or components (e.g., the first prism 460a and the second prism 460b) which are adhered to one another. For example, the first prism 460a and second prism 460b may be cemented to each other. In some implementations in which the third optical component 460 is employed, the light beam 490 which passes through the first optical component 420 along the axis A1 may be deflected a plurality of times in various directions via a plurality of optical devices or components (e.g., the first prism 460a and the second prism 460b). For example, the light beam 490 may be emitted to the second optical component 440 along axis A2 which is transverse or oblique to the axis A1 by a particular angle θ. In some implementations, the particular angle θ may be about 25 degrees, for example between about 15 degrees to about 35 degrees. For example, the third optical component 460 may be configured to be adjustable to change the particular angle at which the beam is reflected toward the second optical component 440. In some implementations, the light beam 490 may be reflected such that the light beam 490 is parallel to the axis along which the light beam is emitted by the light source (e.g., the particular angle may be about 0 degrees, or may be adjustable between about 0 degrees to about 35 degrees). In some implementations, a distance d1 along the length direction Y between an entry side of the first optical component 420 and an exit side of the second optical component 440 may be about 7 mm, or between about 5 mm and about 9 mm.

For example, in FIG. 4D, the optical component 460' includes a plurality of optical devices or components (e.g., the first prism 460a' and the second prism 460b') which are separated from one another. For example, the first prism 460a' and the second prism 460b' may be separated from one another by a predetermined distance in the width direction X. In some implementations in which the optical component 460' is employed, the light beam which passes through the first optical component 420 along an axis (e.g., the axis A1) may be deflected a plurality of times in various directions via a plurality of optical devices or components (e.g., the first prism 460a' and the second prism 460b'). For example, the light beam may be emitted to second optical component 440 along an axis which is transverse or oblique the axis along which the light beam is emitted by the light source (e.g., the axis A1) by a particular angle. In some implementations, the particular angle may be about 25 degrees, for example between about 15 degrees to about 35 degrees. For example, the third optical component 460 may be configured to be adjustable to change the particular angle at which the beam is reflected toward the second optical component 440. In some implementations, the light beam may be reflected such that the light beam is parallel to the axis along which the light beam is emitted by the light source (e.g., the particular angle may be about 0 degrees, or may be adjustable between about 0 degrees to about 35 degrees). In some implementations, a distance d1 along the length direction Y between an entry side of the first optical component 420 and an exit side of the second optical component 440 may be about 7 mm, or between about 5 mm and about 9 mm.

FIG. 4E depicts an example structural configuration of a third optical component, according to example embodiments of the disclosure. In FIG. 4E, the fourth optical component 480 is provided between the first optical circuit chip 470 and the optical chip assembly 450 (e.g., the U-turn chip 452). The fourth optical component 480 may be configured to direct the light beams which are emitted by the first optical circuit chip 470 to focus the light beams onto the U-turn chip 452.

In some implementations, the fourth optical component 380 may include a plurality of lens arrays. For example, the lens arrays may be configured to shape and collimate the light beams before the light beams are transmitted to the U-turn chip 452. In some implementations, the fourth optical component 380 (e.g., a plurality of lens arrays including the first lens array 480a and the second lens array 480b) may be formed of a different material than the first optical component 420 and/or the second optical component 440. For example, the fourth optical component 480 may be formed of silicon while the first optical component 420 and/or the second optical component 440 may be formed of glass.

Referring to FIG. 4E, in some implementations, a plurality of light beams are emitted from the first optical circuit chip 470 to the U-turn chip 452 via the fourth optical component 480. For example, FIG. 4E depicts a first light beam 490a which is emitted from a first output port 472a of the first optical circuit chip 470 along the axis A6, directed by the first lens array 480a and the second lens array 480b, and received at the first input port 452a of the U-turn chip 452. A second light beam 490b is also emitted from a second output port 472b of the first optical circuit chip 470 along the axis A7, directed by the first lens array 480a and the second lens array 480b, and received at the second input port 452b of the U-turn chip 452. In some implementations, the axis A6 may be separated by a centerline axis A5 of the fourth optical component 480 by a particular angle $\alpha$. For example, the particular angle $\alpha$ may be about 7 degrees, for example between about 5 degrees and about 9 degrees. In some implementations, a distance d2 along the length direction Y between an entry side of the first lens array 480a and an exit side of the second lens array 480b may be about 3 mm, or between about 2 mm and about 4 mm.

Figure 5A:
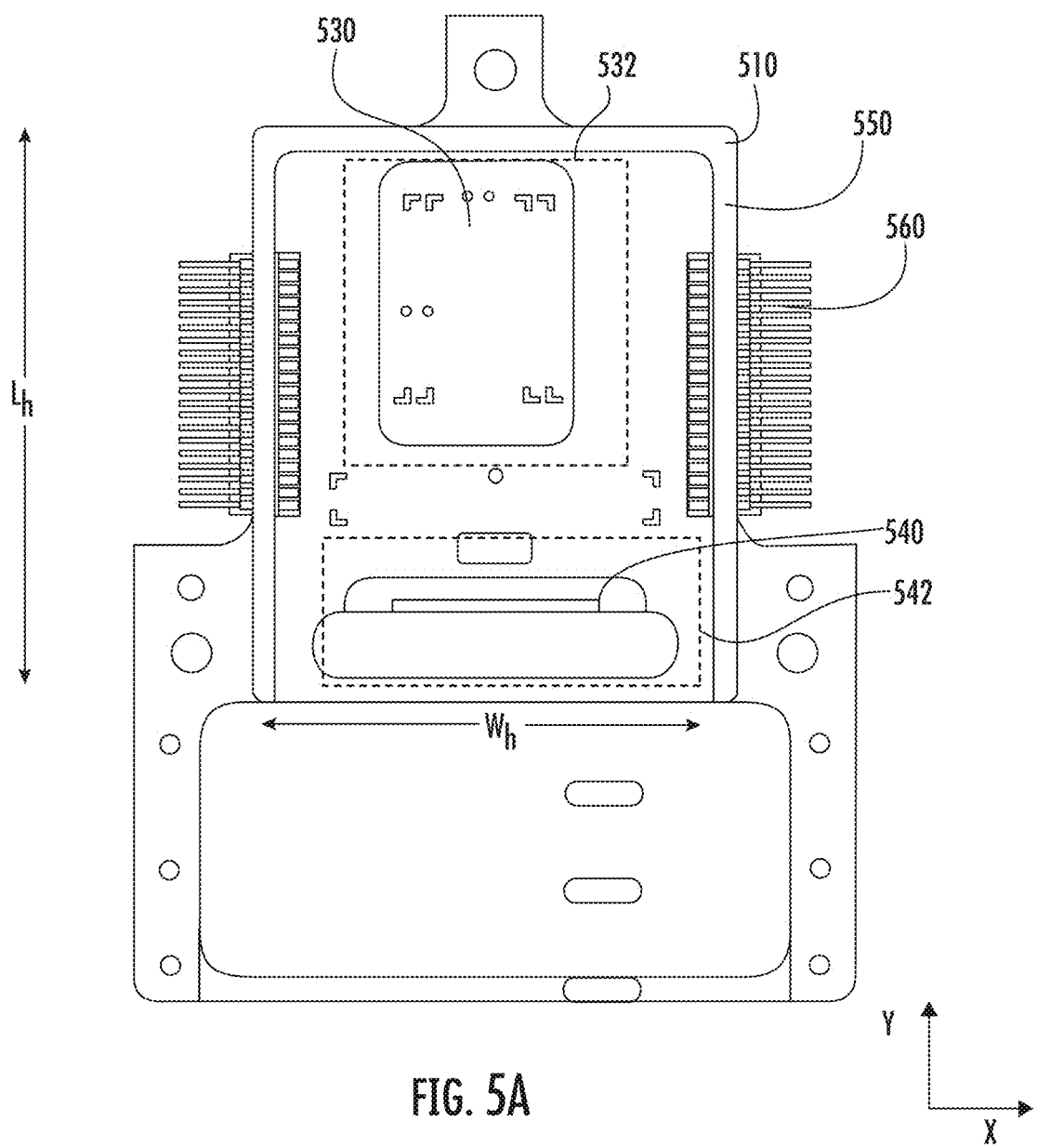
FIG. 5A depicts an example plan view of a housing for a micro optics assembly, according to some implementations of the disclosure.
Figure 5B:
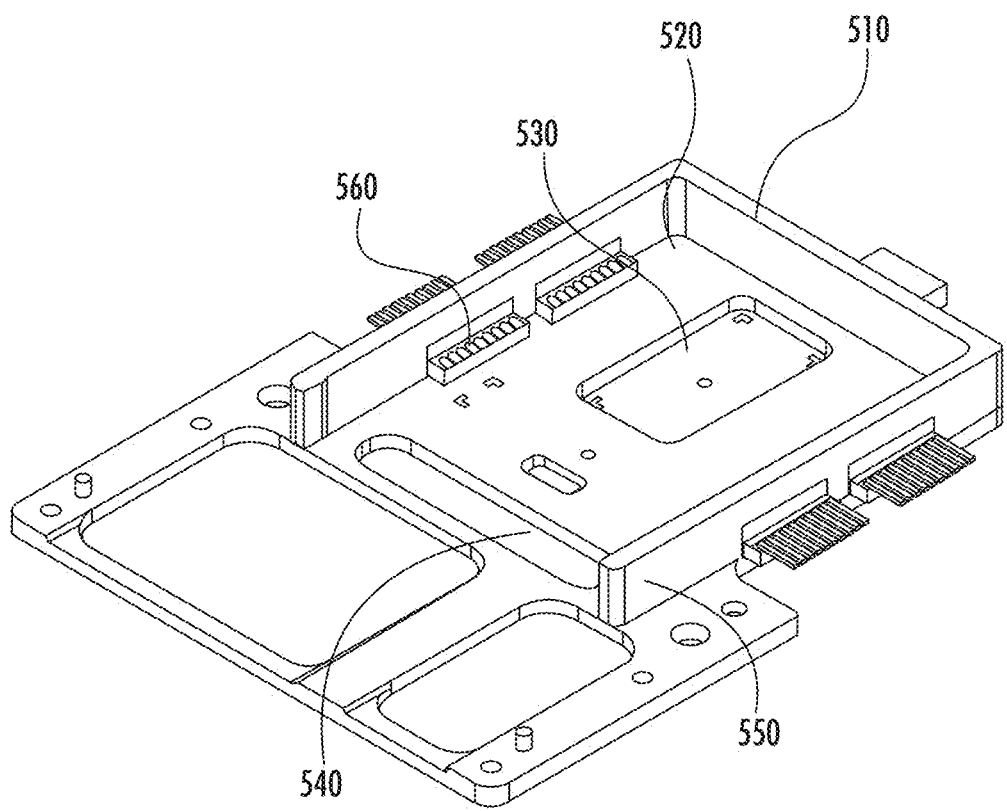
FIG. 5B depicts an example perspective view of the housing for the micro optics assembly, according to some implementations of the disclosure.

FIG. 5A depicts an example plan view of a housing for a micro optics assembly, according to examples of the disclosure. FIG. 5B depicts an example perspective view of the housing for the micro optics assembly, according to examples of the disclosure.

According to examples of the disclosure, at least some optical components of a micro optics assembly for a LIDAR system can be provided in a housing 510. The number of elements that make up the micro optics assembly may be varied or reduced to achieve a streamlined arrangement having a compact size which can be accommodated in the housing 510. Examples of micro optics assemblies which can at least be partially provided within the housing 510 are described herein (e.g., with respect to FIGS. 3A to 4E). In an example embodiment, the housing 510 includes a cavity 520, where the housing 510 has a length $L_h$ defined along the length direction Y and a width $W_h$ defined along the width direction X that is perpendicular to the length direction Y. For example, a first mount 530 (e.g., the first mounting area) may be positioned at a first portion 532 of the housing 510 within the cavity 520 and a second mount 540 (e.g., the second mounting area) may be positioned at a second portion 542 of the housing 510 within the cavity 520. For example, the first mount 530 may be formed of a common ceramic or a thermoelectric cooler (TEC). For example, the first portion 532 of the housing may have an area dimension of about 18 mm×about 7 mm or about 20 mm×about 10 mm. The housing 510 may also include: (i) a machined CuW base with cutouts, through-holes, and laser-etched fiducials, (ii) a 3-sided CuW wall (e.g., the plurality of walls 550) with cutouts for the electrical interfaces 560 (e.g., feedthroughs), and (iii) AlN electrical feedthroughs for DC and RF electrical signals. For example, in some implementations the cavity 520 may have interior dimensions of about 37 mm in width, about 43 mm in length, and about 6 mm in height, or about 35 mm to about 40 mm in width, about 40 mm to about 45 mm in length, and about 4 mm to about 8 mm in height.

The housing 510 may include a plurality of walls 550 which at least partially enclose optical components inside the housing 510. For example, at least some portions of the housing 510 may be formed of gold. The housing 510 may be configured to provide a protective environment to shield optical components of a LIDAR system from environmental factors such as dust, moisture, temperature fluctuations, physical damage, etc. The housing 510 may be formed of a material (e.g., gold or gold-plated surfaces) to help reflect stray light and minimize interference. The housing 510 may be fully enclosed or partially enclosed by the plurality of walls 550. The housing 510 (or the plurality of walls 550) may be hermetically sealed or at least partially hermetically sealed. The housing 510 (or the plurality of walls 550) may include one or more transparent windows or optical ports to allow light beams to be emitted outside of the housing 510 and to receive returning light beams. The housing 510 (or the plurality of walls 550) may include the electrical interfaces 560 (e.g., ports, connectors, feedthroughs, and the like) to allow for electrical connections for power, data transfer, and control signals to the various optical components inside the housing 510.

According to examples of the disclosure, the micro optics assembly may include a first portion which is provided on (disposed on) the first mount 530 and a second portion which is provided on (disposed on) the second mount 540. In some implementations, the first mount 530 (on which the first portion of the micro optics assembly is provided) may have a length which is greater than its width. For example, the length of the first mount 530 may range from about 15 millimeters to about 25 millimeters (e.g., about 16 mm to about 20 mm) while the width of the first mount 530 may range from about 5 millimeters to about 15 millimeters (e.g., about 6 mm to about 10 mm). In some implementations, the first mount 530 includes a ceramic substrate or a thermoelectric cooler substrate.

In some implementations, the second mount 540 (on which the second portion of the micro optics assembly is provided) is wider than the first mount 530 and the first mount 530 is greater in length than the second mount 540. For example, the length of the second mount 540 may range from about 8 millimeters to about 12 millimeters while the width of the second mount 540 may range from about 8 millimeters to about 20 millimeters (e.g., about 8 mm to about 17 mm). In some implementations, the second mount 540 includes a ceramic substrate or a thermoelectric cooler substrate. For example, the first mount 530 may be spaced apart from the second mount 540 in the length direction Y by about 2 mm to about 4 mm.

In some implementations, the plurality of walls 550 may have a thickness of about 1.5 mm to about 3 mm, for example about 2 mm to about 2.5 mm.

Figure 6A:
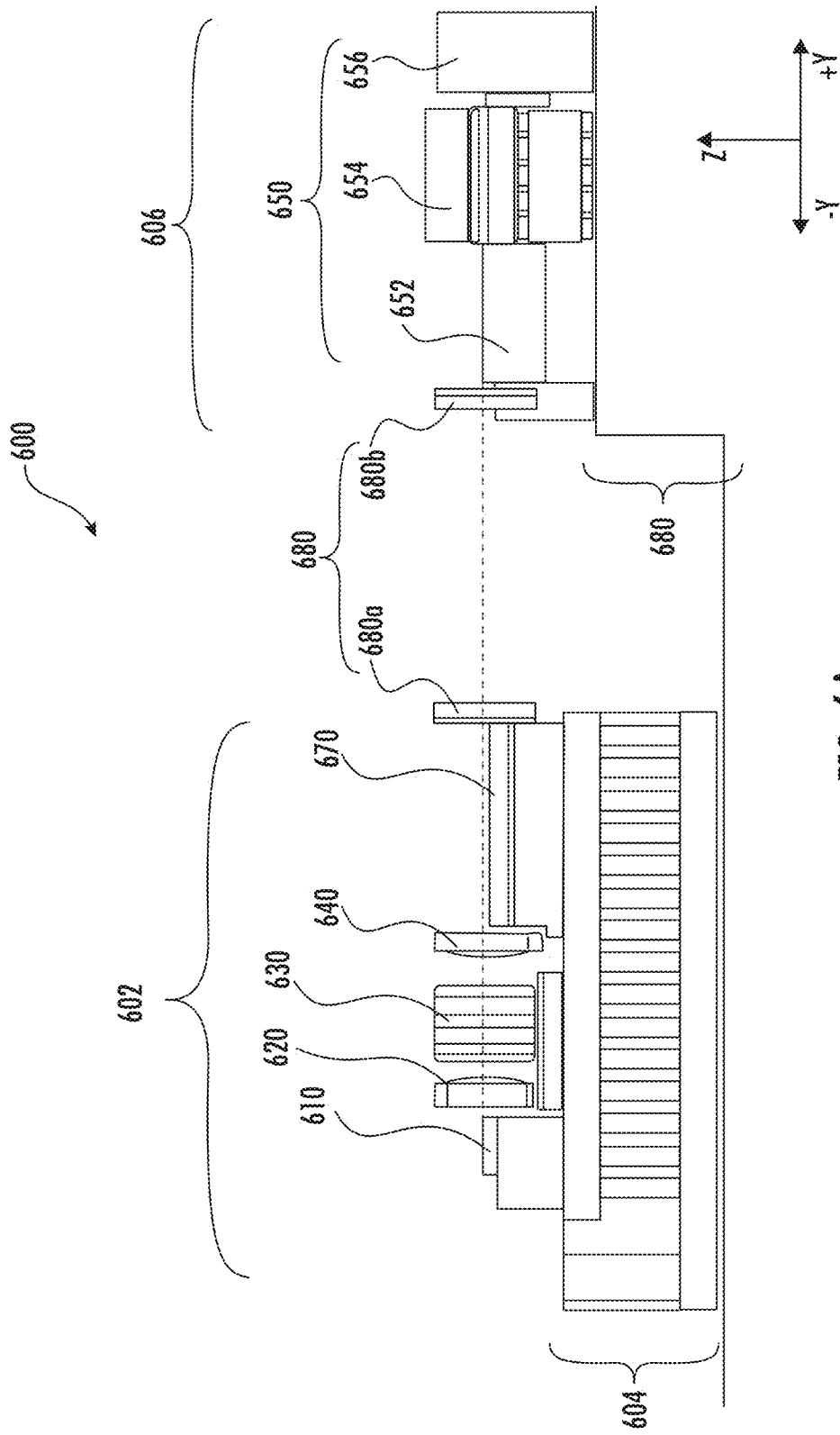
FIG. 6A depicts example optical components of a micro optics assembly mountable in a housing, according to some implementations of the disclosure.

FIG. 6A depicts example optical components of a micro optics assembly mountable in a housing, according to examples of the disclosure. FIG. 6B depicts a perspective view of optical components of a micro optics assembly mountable in a housing, according to examples of the disclosure.

As shown in FIGS. 6A and 6B, the depicted micro optics assemblies can include a light source 610, a first optical component 620, an optical isolator 630, a second optical component 640, a third optical component 660, a first optical circuit chip 670, a fourth optical component 680, and an optical chip assembly 650. The light source 610, the first optical component 620, the optical isolator 630, the second optical component 640, the third optical component 660, the first optical circuit chip 670, the fourth optical component 680, and the optical chip assembly 650 correspond respectively to the light source 310, the first optical component 320, the optical isolator 330, the second optical component 340, the third optical component 360, the first optical circuit chip 370, the fourth optical component 380, and the optical chip assembly 350 as shown in FIG. 3C, and descriptions thereof will not be repeated for the sake of brevity.

As described above, the micro optics assembly may include a first portion which is provided on (disposed on) a first mount and a second portion which is provided on (disposed on) a second mount. In FIG. 6A, a micro optics assembly 600 includes a first portion 602 mounted on a first mount 604 and a second portion 606 mounted on a second mount 608.

In FIG. 6A, the first portion 602 of the micro optics assembly includes: a light source 610 configured to emit a light beam, a first optical component 620 (e.g., a collimating lens) configured to direct the light beam emitted by the light source 610, an optical isolator 630 configured to allow the light beam directed by the first optical component 620 to pass through the optical isolator 630 in a first direction (e.g., the +Y direction) and to prevent light from being reflected back into the light source 610 through the optical isolator 630 in a second direction (e.g., the −Y direction), and a second optical component 640 (e.g., a collimating lens) configured to direct the light beam after having passed through the optical isolator 630. In some implementations, the first portion 602 may further include a first optical circuit chip 670 provided between the second optical component 640 and the second portion 606. In some implementations, the micro optics assembly 600 may further include a fourth optical component 680 in which a portion (e.g., a first micro lens array 680a) is provided at the first portion 602 between the first optical circuit chip 670 and the second portion 606, and another portion (e.g., a second micro lens array 680b) is provided at the second portion 606 between a U-turn chip 652 and the first portion 602. As shown in FIG. 6B, in some implementations a first portion 602' of a micro optics assembly may include optical components similar to the configuration of FIG. 6A and further include a third optical component 660 provided between the second optical component 640 and the optical isolator 630 which are mounted to first mount 604'.

The second portion 606 of the micro optics assembly 600 may include: an optical chip assembly 650 to receive the light beam after having been directed by the second optical component 640 (or after having been directed by the fourth optical component 680). In some implementations, the optical chip assembly 650 includes a U-turn chip 652, a semiconductor optical amplifier (SOA) chip 654, and a second optical circuit chip 656 (e.g., a PIC chip or a PLC chip). The U-turn chip 652, the SOA chip 654, and the second optical circuit chip 656 may be stacked sequentially with respect to each other in the Y direction, with the U-turn chip 652 being furthest upstream (closest to the light source 610) and the second optical circuit chip 656 being the furthest downstream. The optical chip assembly 650 can be configured to amplify the light beam to produce an amplified light beam, split the amplified light beam into a plurality of distributed light beams, and emit the plurality of distributed light beams toward an object (e.g., an object in the environment of a vehicle).

In some implementations, the first portion 602 may be spaced apart from the second portion 606 by about 3 mm, or between about 2 mm to about 4 mm. In some implementations, the first portion 602 may be provided at a first height based on the location and position of the first mount 604, while the second portion 606 may be provided at a second height based on the location and position of the second mount 608. For instance, the second height of the second portion 606 may be different than the first height, for instance, at heights that are different by about 1.5 mm or between about 1 mm and about 3 mm.

Figure 7A:
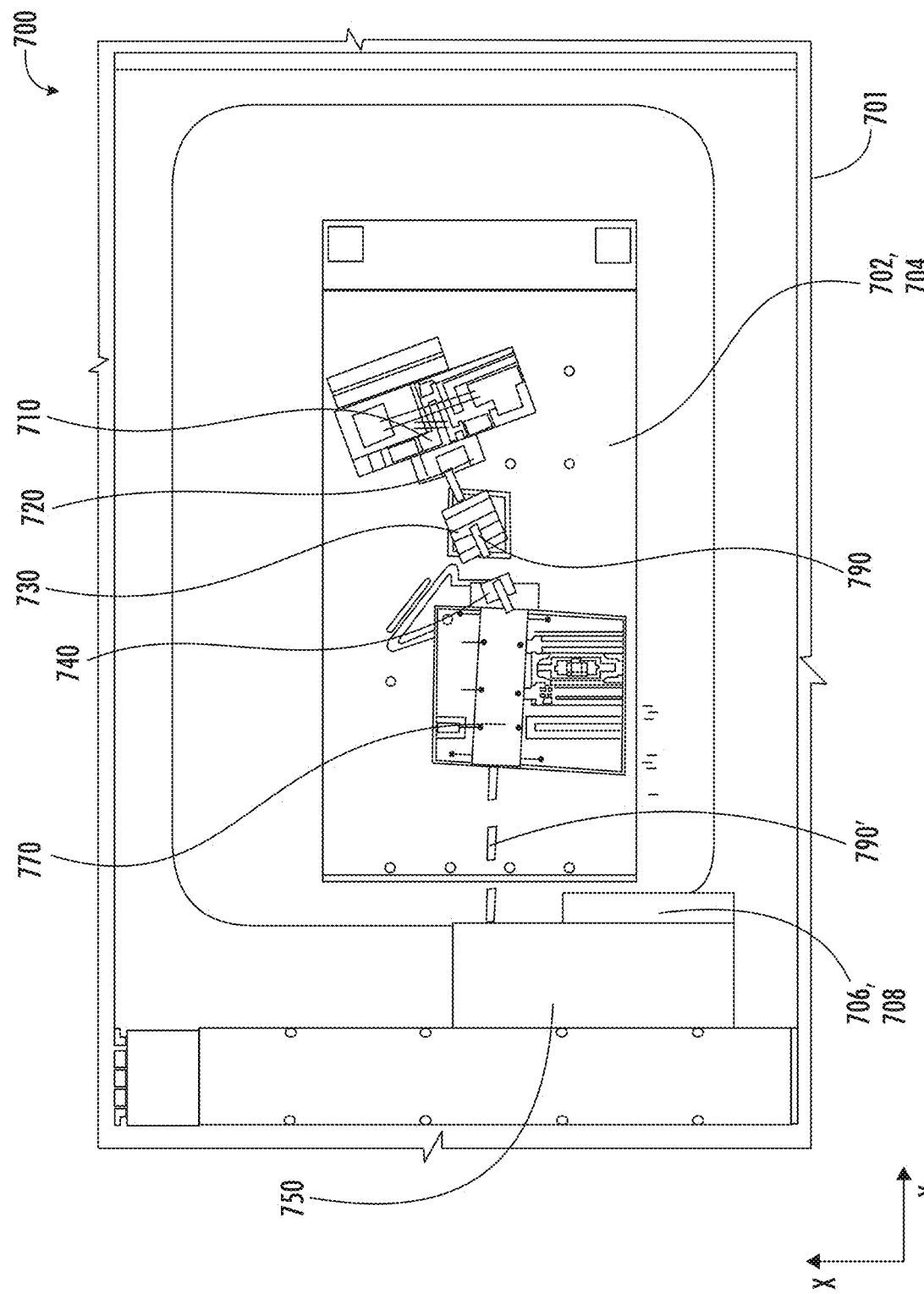
FIGS. 7A through 7C depict example optical components of a micro optics assembly provided in a housing, according to some implementations of the disclosure.
Figure 7B:
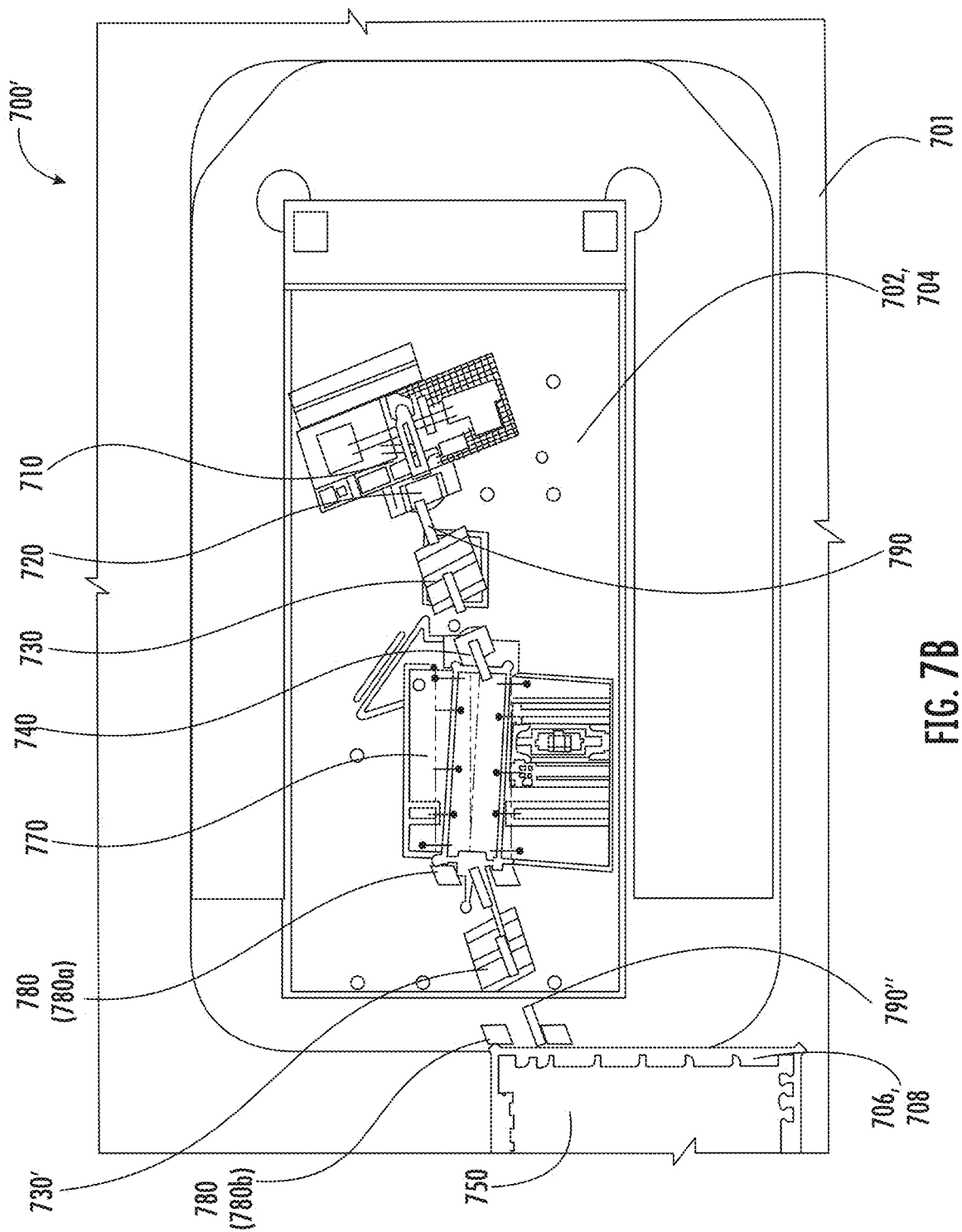
Figure 7C:
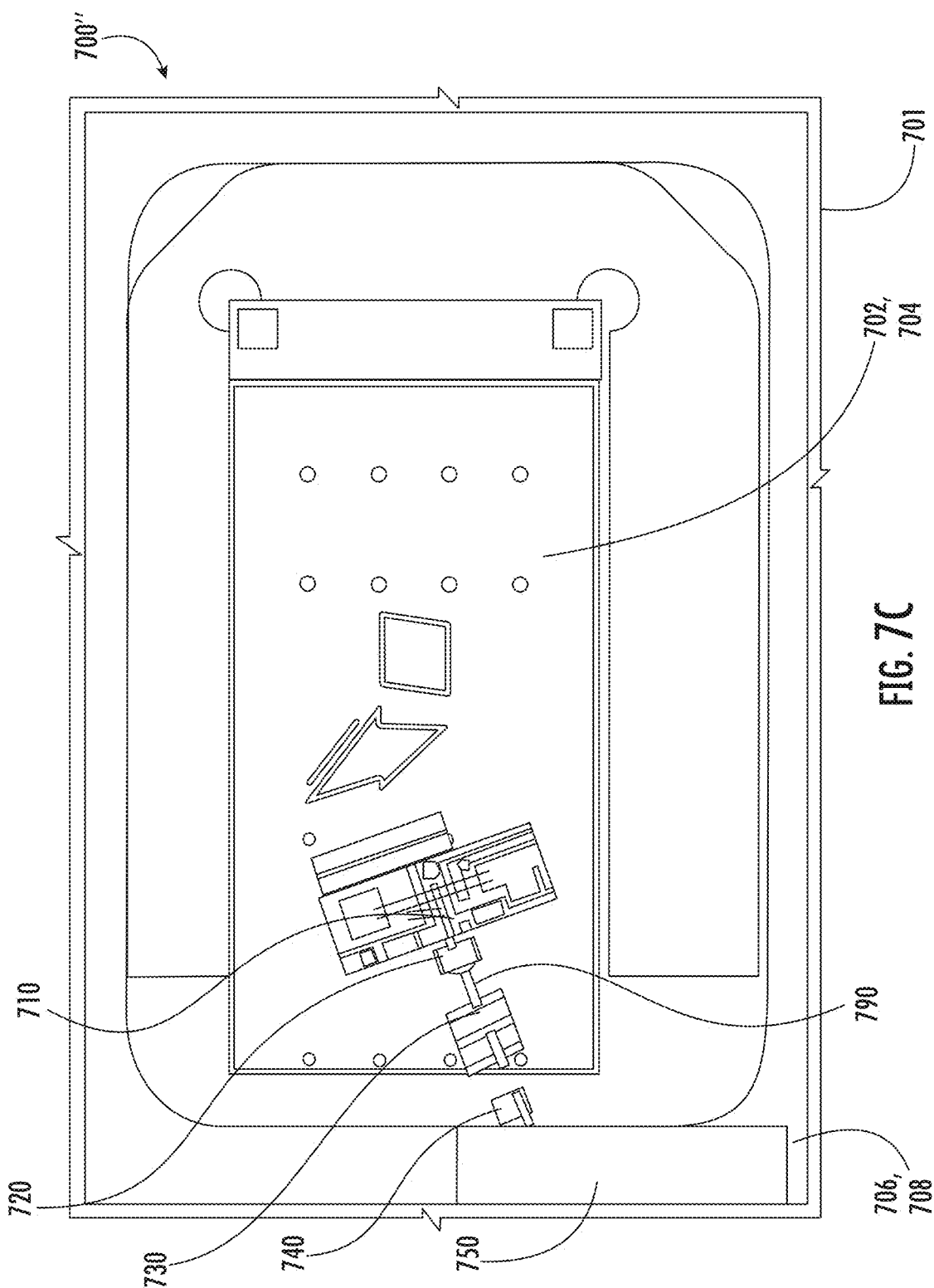

FIGS. 7A through 7C depict example optical components of a micro optics assembly provided in a housing, according to examples of the disclosure.

As shown in FIGS. 7A through 7C, the depicted micro optics assemblies include at least some of a light source 710, a first optical component 720, an optical isolator 730, a second optical component 740, a first optical circuit chip 770, a third optical component 780, and an optical chip assembly 750. The light source 710, the first optical component 720, the optical isolator 730, the second optical component 740, the first optical circuit chip 770, the third optical component 780, and the optical chip assembly 750 correspond respectively to the light source 310, the first optical component 320, the optical isolator 330, the second optical component 340, the first optical circuit chip 370, the fourth optical component 380, and the optical chip assembly 350 as shown in FIG. 3C, and descriptions thereof will not be repeated for the sake of brevity. As shown in FIGS. 7A through 7C, optical components of the depicted micro optics assemblies, housings, mounts, and the like may have similar sizes and dimensions as the optical components of the micro optics assemblies, housings, mounts described herein with respect to FIGS. 3A through 6B. For example, the first portion 702 and the first mount 704 may have similar sizes and dimensions as the first portion 532 and the first mount 530 of FIG. 5A.

In FIG. 7A, in a first configuration 700 the housing 701 includes a first portion 702 on which a first mount 704 is provided. The first mount 704 includes a first plurality of optical components for a micro optics assembly. For example, in FIG. 7A the first mount 704 includes a light source 710, a first optical component 720, an optical isolator 730, a second optical component 740, and a first optical circuit chip 770. In some implementations, the first mount 704 may also include an optical component provided between the first optical component 720 and the second optical component 740, similar to the third optical component 460 described herein with respect to the micro optics assembly of FIG. 4A. In some implementations, the first mount 704 may also include a portion of a third optical component (e.g., a micro lens array) provided between the first optical circuit chip 770 and the optical chip assembly 750, similar to the fourth optical component 480 (e.g., the first lens array 480*a*) described herein with respect to the micro optics assembly of FIG. 4A.

In FIG. 7A, in the first configuration 700 the housing 701 also includes a second portion 706 on which a second mount 708 is provided. The second mount 708 includes a second plurality of optical components for a micro optics assembly. For example, in FIG. 7A the second mount 708 includes the optical chip assembly 750. In some implementations, the optical chip assembly 750 can include a U-turn chip, a second optical circuit chip (e.g., a PIC chip or a PLC chip), and a semiconductor optical amplifier (SOA) chip, similar to the U-turn chip 452, the SOA chip 454, and the second optical circuit chip 456, described herein with respect to the micro optics assembly of FIG. 4A. In some implementations, the optical chip assembly 750 can include the U-turn chip, and the second optical circuit chip and the SOA chip are provided external to the housing 701. In some implementations, the optical chip assembly 750 can include the U-turn chip and the second optical circuit chip, and the SOA chip is provided external to the housing 701.

In some implementations, the second mount 708 may also include a portion of a third optical component (e.g., a micro lens array) provided between the first optical circuit chip 770 and the optical chip assembly 750, similar to the fourth optical component 480 (e.g., the second lens array 480*b*) described herein with respect to the micro optics assembly of FIG. 4A.

As illustrated in FIG. 7A, the light beam 790 emitted by the light source 710 may be emitted at a first particular angle and the light beam(s) 790' emitted from the first optical circuit chip 770 are emitted at a second particular angle, different from the first particular angle. For example, the first particular angle may be about ±20 degrees (e.g., about ±15 degrees to about ±25 degrees with respect to an axis parallel to the Y direction) and the second particular angle may be about 0 degrees (e.g., about ±5 degrees with respect to an axis parallel to the Y direction).

In FIG. 7B, in a second configuration 700' the housing 701 includes a first portion 702 on which a first mount 704 is provided. The first mount 704 includes a first plurality of optical components for a micro optics assembly. For example, in FIG. 7B the first mount 704 includes a light source 710, a first optical component 720, an optical isolator 730, a second optical component 740, a first optical circuit chip 770, a portion of a third optical component 780 (e.g., the micro lens array 780*a*), and a further optical isolator 730'. The further optical isolator 730' may be similar to the optical isolator 730. In some implementations, the first mount 704 may also include an optical component provided between the first optical component 720 and the second optical component 740, similar to the third optical component 460 described herein with respect to the micro optics assembly of FIG. 4A.

In FIG. 7B, in the second configuration 700' the housing 701 also includes a second portion 706 on which a second mount 708 is provided. The second mount 708 includes a second plurality of optical components for a micro optics assembly. For example, in FIG. 7B, the second mount 708 includes the optical chip assembly 750 and a portion of a third optical component 780 (e.g., the micro lens array 780*b*). In some implementations, the optical chip assembly 750 can include a U-turn chip, a second optical circuit chip (e.g., a PIC chip or a PLC chip), and a semiconductor optical amplifier (SOA) chip, similar to the U-turn chip 452, the SOA chip 454, and the second optical circuit chip 456, described herein with respect to the micro optics assembly of FIG. 4A. In some implementations, the optical chip assembly 750 can include the U-turn chip, and the second optical circuit chip and the SOA chip are provided external to the housing 701. In some implementations, the optical chip assembly 750 can include the U-turn chip and the second optical circuit chip, and the SOA chip is provided external to the housing 701.

In some implementations, the second mount 708 may also include a portion of a third optical component (e.g., a micro lens array) provided between the first optical circuit chip 770 and the optical chip assembly 750, similar to the fourth optical component 480 (e.g., the second lens array 480*b*) described herein with respect to the micro optics assembly of FIG. 4A.

As illustrated in FIG. 7B, the light beam 790 emitted by the light source 710 may be emitted at a first particular angle and the light beam(s) 790" emitted from the first optical circuit chip 770 are also emitted at the first particular angle. For example, the first particular angle may be about ±20 degrees (e.g., about ±15 degrees to about ±25 degrees with respect to an axis parallel to the Y direction).

In FIG. 7C, in a third configuration 700" the housing 701 includes a first portion 702 on which a first mount 704 is provided. The first mount 704 includes a first plurality of optical components for a micro optics assembly. For example, in FIG. 7C the first mount 704 includes a light source 710, a first optical component 720, and an optical isolator 730. In some implementations, the first mount 704 may also include an optical component provided between the first optical component 720 and the second optical component 740, similar to the third optical component 460 described herein with respect to the micro optics assembly of FIG. 4A.

In FIG. 7C, in the third configuration 700″ the housing 701 also includes a second portion 706 on which a second mount 708 is provided. The second mount 708 includes a second plurality of optical components for a micro optics assembly. For example, in FIG. 7C the second mount 708 includes the optical chip assembly 750 and the second optical component 740. In some implementations, the optical chip assembly 750 can include a U-turn chip, a second optical circuit chip (e.g., a PIC chip or a PLC chip), and a semiconductor optical amplifier (SOA) chip, similar to the U-turn chip 452, the SOA chip 454, and the second optical circuit chip 456, described herein with respect to the micro optics assembly of FIG. 4A. In some implementations, the optical chip assembly 750 can include the U-turn chip, and the second optical circuit chip and the SOA chip are provided external to the housing 701. In some implementations, the optical chip assembly 750 can include the U-turn chip and the second optical circuit chip, and the SOA chip is provided external to the housing 701.

As illustrated in FIG. 7C, the light beam 790 emitted by the light source 710 may be emitted at a particular angle. For example, the particular angle may be about ±20 degrees (e.g., about ±15 degrees to about ±25 degrees with respect to an axis parallel to the Y direction). In some implementations, the particular angle may be about 0 degrees (e.g., about ±5 degrees with respect to an axis parallel to the Y direction).

The preceding description of the disclosed examples is provided to enable any person skilled in the art to make or use the disclosure. Various modifications to these examples will be readily apparent to those skilled in the art, and the generic principles defined herein may be applied to some examples without departing from the spirit or scope of the disclosure. Thus, the disclosure is not intended to be limited to the examples shown herein but is to be accorded the widest scope consistent with the following claims and the principles and novel features disclosed herein.

Terms used herein are used to describe the example embodiments and are not intended to limit and/or restrict the disclosure. The singular forms "a," "an" and "the" are intended to include the plural forms as well, unless the context clearly indicates otherwise. In this disclosure, terms such as "including", "having", "comprising", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, the elements are not limited by these terms. Instead, these terms are used to distinguish one element from another element. For example, without departing from the scope of the disclosure, a first element may be termed as a second element, and a second element may be termed as a first element.

It will be understood that when an element is referred to as being "connected" to another element, the expression encompasses an example of a direct connection or direct coupling, as well as a connection or coupling with one or more other elements interposed therebetween.

The term "and/or" includes a combination of a plurality of related listed items or any item of the plurality of related listed items. For example, the scope of the expression or phrase "A and/or B" includes the item "A", the item "B", and the combination of items "A and B".

In addition, the scope of the expression or phrase "at least one of A or B" is intended to include all of the following: (1) at least one of A, (2) at least one of B, and (3) at least one of A and at least one of B. Likewise, the scope of the expression or phrase "at least one of A, B, or C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

The numerical ranges and parameters setting forth the broad scope are approximations, and the numerical values set forth in specific non-limiting examples are provided as examples. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10 (e.g., 1 to 4).

The foregoing describes the technology of this disclosure within the context of a LIDAR system and an autonomous vehicle for example purposes only. As described herein, the technology described herein is not limited to an autonomous vehicle and can be implemented for or within other systems, autonomous platforms, and other computing systems.

What is claimed is:

1. A light detection and ranging (LIDAR) system for a vehicle, comprising:
 a housing defining a cavity having a length defined along a first axis and a width defined along a second axis that is different from the first axis;
 a first mount positioned at a first portion of the housing within the cavity;
 a second mount positioned at a second portion of the housing within the cavity; and
 a micro optics assembly including a first portion which is provided on the first mount and a second portion which is provided on the second mount, wherein:
 the first portion of the micro optics assembly comprises:
 a light source configured to emit a beam,
 at least one first optical component configured to direct the beam emitted by the light source,
 at least one optical isolator configured to allow the beam directed by the at least one first optical component to pass through the at least one optical isolator in a first direction and to prevent light from being reflected back into the light source through the at least one optical isolator in a second direction, and
 at least one second optical component configured to direct the beam after having passed through the at least one optical isolator, and the second portion of the micro optics assembly comprises:
an optical chip assembly comprising a plurality of chips configured to receive the beam after having been directed by the at least one second optical component, and
wherein the first portion of the micro optics assembly further comprises at least one third optical component configured to direct the beam after having passed through the at least one second optical component.

2. The LIDAR system of claim 1, wherein a length of the first mount is greater than a width of the first mount.

3. The LIDAR system of claim 2, wherein the length of the first mount ranges from about 15 millimeters to about 30 millimeters.

4. The LIDAR system of claim 3, wherein the width of the first mount ranges from about 5 millimeters to about 10 millimeters.

5. The LIDAR system of claim 1, wherein the first mount comprises a ceramic substrate or a thermoelectric cooler substrate.

6. The LIDAR system of claim 1, wherein the first portion of the micro optics assembly further comprises:
at least one fourth optical component configured to reflect the beam that has passed through the at least one optical isolator toward the at least one second optical component at a particular angle.

7. The LIDAR system of claim 6, wherein the at least one fourth optical component includes a 90-degree prism having two perpendicular faces forming an angle of 90 degrees.

8. The LIDAR system of claim 6, wherein the at least one fourth optical component is adjustable to change the particular angle at which the beam is reflected toward the at least one second optical component.

9. The LIDAR system of claim 8, wherein the at least one fourth optical component is adjustable to change the particular angle between about 0 degrees and about 30 degrees.

10. The LIDAR system of claim 6, wherein the first portion of the micro optics assembly further comprises:
an optical circuit chip provided between the at least one second optical component and the optical chip assembly; and
the at least one third optical component is provided between the optical circuit chip and the optical chip assembly.

11. The LIDAR system of claim 1, wherein the first portion of the micro optics assembly further comprises:
an optical circuit chip provided between the at least one second optical component and the optical chip assembly; and
the at least one third optical component is provided between the optical circuit chip and the optical chip assembly.

12. The LIDAR system of claim 11, wherein:
the optical circuit chip includes a photonic integrated circuit chip or a programmable logic controller, and
the at least one third optical component includes a lens array.

13. The LIDAR system of claim 11, wherein:
the optical circuit chip is configured to receive the beam after having been directed by the at least one second optical component and is further configured to split the beam into a plurality of beams, and
an axis along which the beam is emitted from the light source is offset from respective axes along which the plurality of beams are emitted from the optical circuit chip.

14. The LIDAR system of claim 1, wherein the second mount is wider than the first mount and the first mount is greater in length than the second mount.

15. The LIDAR system of claim 1, wherein the first mount is spaced apart from the second mount in a length direction of the first mount between about 2 mm to about 4 mm.

16. The LIDAR system of claim 1, wherein the at least one third optical component is provided between the at least one second optical component and the optical chip assembly,
the at least one first optical component and the at least one second optical component each include a collimating lens formed of a first material, and
the at least one third optical component includes a lens array formed of a second material, different from the first material.

17. The LIDAR system of claim 1, wherein:
the optical chip assembly is configured to amplify the beam to produce an amplified beam, split the amplified beam into a plurality of distributed beams, and emit the plurality of distributed beams toward an object.

18. An autonomous vehicle control system for a vehicle, comprising:
one or more processors; and
a light detection and ranging (LIDAR) system, the LIDAR system comprising:
a housing defining a cavity having a length defined along a first axis and a width defined along a second axis that is different from the first axis;
a first mount positioned at a first portion of the housing within the cavity;
a second mount positioned at a second portion of the housing within the cavity; and
a micro optics assembly including a first portion of the micro optics assembly provided on the first mount and a second portion of the micro optics assembly provided on the second mount, wherein:
the first portion of the micro optics assembly comprises:
a light source configured to emit a beam,
at least one first optical component configured to direct the beam emitted by the light source,
at least one optical isolator configured to allow the beam direct directed by the at least one first optical component to pass through the at least one optical isolator in a first direction and to prevent light from being reflected back into the light source through the at least one optical isolator in a second direction, and
at least one second optical component configured to direct the beam after having passed through the at least one optical isolator, and
the second portion of the micro optics assembly comprises:
an optical chip assembly comprising a plurality of chips configured to receive the beam after having been directed by the at least one second optical component, and
wherein the first portion of the micro optics assembly further comprises at least one third optical component configured to direct the beam after having passed through the at least one second optical component.

19. An autonomous vehicle, comprising:
an autonomous vehicle control system, the autonomous vehicle control system comprising one or more processors and a light detection and ranging (LIDAR) system, the LIDAR system comprising:

a housing defining a cavity having a length defined along a first axis and a width defined along a second axis that is different from the first axis;

a first mount positioned at a first portion of the housing within the cavity;

a second mount positioned at a second portion of the housing within the cavity; and a micro optics assembly including a first portion of the micro optics assembly provided on the first mount and a second portion of the micro optics assembly provided on the second mount, wherein:

the first portion of the micro optics assembly comprises:
  a light source configured to emit a beam,
  at least one first optical component configured to direct the beam emitted by the light source,
  at least one optical isolator configured to allow the beam directed by the at least one first optical component to pass through the at least one optical isolator in a first direction and to prevent light from being reflected back into the light source through the at least one optical isolator in a second direction, and
  at least one second optical component configured to direct the beam after having passed through the at least one optical isolator, and the second portion of the micro optics assembly comprises:
  an optical chip assembly comprising a plurality of chips configured to receive the beam after having been directed by the at least one second optical component, and wherein the first portion of the micro optics assembly further comprises at least one third optical component configured to direct the beam after having passed through the at least one second optical component.

20. A light detection and ranging (LIDAR) system for a vehicle, comprising:

a housing defining a cavity having a length defined along a first axis and a width defined along a second axis that is different from the first axis;

a first mount positioned at a first portion of the housing within the cavity;

a second mount positioned at a second portion of the housing within the cavity; and a micro optics assembly including a first portion which is provided on the first mount and a second portion which is provided on the second mount, wherein:

the first portion of the micro optics assembly comprises:
  a light source configured to emit a beam,
  at least one first optical component configured to direct the beam emitted by the light source,
  at least one optical isolator configured to allow the beam directed by the at least one first optical component to pass through the at least one optical isolator in a first direction and to prevent light from being reflected back into the light source through the at least one optical isolator in a second direction,
  at least one second optical component configured to direct the beam after having passed through the at least one optical isolator, and
  at least one third optical component configured to reflect the beam that has passed through the at least one optical isolator toward the at least one second optical component at a particular angle, and the second portion of the micro optics assembly comprises:
  an optical chip assembly comprising a plurality of chips configured to receive the beam after having been directed by the at least one second optical component.

* * * * *